US012061018B2

United States Patent
Ghasemi et al.

(10) Patent No.: US 12,061,018 B2
(45) Date of Patent: Aug. 13, 2024

(54) SYSTEMS AND METHODS FOR FULL SPECTRUM SOLAR THERMAL ENERGY HARVESTING AND STORAGE BY MOLECULAR AND PHASE CHANGE MATERIAL HYBRIDS

(71) Applicant: University of Houston System, Houston, TX (US)

(72) Inventors: Hadi Ghasemi, Spring, TX (US); Varun Kashyap, Houston, TX (US); T. Randall Lee, Houston, TX (US); Siwakorn Sakunkaewkasem, Houston, TX (US)

(73) Assignee: University of Houston System, Houston, TX (US)

( * ) Notice: Subject to any disclaimer, the term of this patent is extended or adjusted under 35 U.S.C. 154(b) by 427 days.

(21) Appl. No.: 17/613,959

(22) PCT Filed: Jun. 24, 2020

(86) PCT No.: PCT/US2020/039328
§ 371 (c)(1),
(2) Date: Nov. 24, 2021

(87) PCT Pub. No.: WO2020/263954
PCT Pub. Date: Dec. 30, 2020

(65) Prior Publication Data
US 2022/0228776 A1 Jul. 21, 2022

Related U.S. Application Data

(60) Provisional application No. 62/866,794, filed on Jun. 26, 2019.

(51) Int. Cl.
*F24S 60/20* (2018.01)
*F24S 20/20* (2018.01)
(Continued)

(52) U.S. Cl.
CPC ............ *F24S 60/20* (2018.05); *F24S 20/20* (2018.05); *F24S 60/10* (2018.05); *F24S 70/10* (2018.05);
(Continued)

(58) Field of Classification Search
CPC .. F24S 10/40; F24S 10/70; F24S 21/00; F24S 70/10; F24S 70/65
(Continued)

(56) References Cited

U.S. PATENT DOCUMENTS

2012/0227926 A1* 9/2012 Field ................. F24S 10/95
165/157
2014/0299122 A1 10/2014 Muren et al.
(Continued)

FOREIGN PATENT DOCUMENTS

CN 102538230 A * 7/2012 ................. F24J 2/34
CN 102538230 B 11/2013
(Continued)

OTHER PUBLICATIONS

International Preliminary Report on Patentability issued by the International Bureau of WIPO in connection with International Application No. PCT/US2020/039328 dated Dec. 28, 2021.
(Continued)

*Primary Examiner* — Ko-Wei Lin
(74) *Attorney, Agent, or Firm* — Carter, DeLuca & Farrell LLP; George Likourezos; Bret P. Shapiro

(57) ABSTRACT

A method for full spectrum solar thermal energy harvesting and collection includes storing a first heat in a phase change material in the presence of solar radiation based on absorbing full spectrum solar radiation, harvesting a second heat from the phase change material in the presence of solar radiation, storing molecular energy in a molecular storage material in the presence of solar radiation based on absorbing full spectrum solar radiation, transferring the second heat from the phase change material to the molecular storage material in the absence of solar radiation, and harvesting the molecular energy released by the molecular storage material.

19 Claims, 22 Drawing Sheets

(51) Int. Cl.
  *F24S 60/10*  (2018.01)
  *F24S 70/10*  (2018.01)
  *F24S 70/65*  (2018.01)
  *F24S 80/56*  (2018.01)
  *F24S 80/00*  (2018.01)

(52) U.S. Cl.
  CPC ............... *F24S 70/65* (2018.05); *F24S 80/56* (2018.05); *F24S 2080/01* (2018.05)

(58) Field of Classification Search
  USPC ................................................ 126/617–618
  See application file for complete search history.

(56) References Cited

U.S. PATENT DOCUMENTS

| | | | | |
|---|---|---|---|---|
| 2015/0027436 A1* | 1/2015 | Mine | ...................... | F24S 10/753 |
| | | | | 126/663 |
| 2015/0159959 A1* | 6/2015 | Petrovic | .................. | F01K 3/006 |
| | | | | 165/10 |
| 2015/0369542 A1 | 12/2015 | Minvielle et al. | | |
| 2016/0033173 A1* | 2/2016 | Rowshan | ................ | F24S 20/02 |
| | | | | 126/646 |
| 2016/0146507 A1* | 5/2016 | Johnson | .................. | F24S 50/20 |
| | | | | 126/714 |
| 2016/0212878 A1 | 7/2016 | Quinn et al. | | |
| 2017/0167755 A1* | 6/2017 | Liu | ......................... | F24S 20/20 |
| 2017/0241671 A1 | 8/2017 | Ahmad | | |
| 2018/0190913 A1 | 7/2018 | Kumar | | |
| 2018/0195741 A1 | 7/2018 | Field et al. | | |
| 2020/0333047 A1* | 10/2020 | Raman | ................... | B32B 18/00 |

FOREIGN PATENT DOCUMENTS

| | | |
|---|---|---|
| DE | 202012003205 U1 | 11/2012 |
| JP | 2006284072 A * | 10/2006 |
| WO | 2019/106029 A1 | 6/2019 |

OTHER PUBLICATIONS

International Search Report issued in corresponding International Application No. PCT/US2020/039328 dated Nov. 2, 2020, pp. 1-4.
Extended European Search Report issued by European Patent Office in connection with International Application No. 20832831.0, dated Jun. 20, 2023.

* cited by examiner

| Re | Thermal Efficiency | 2D Losses |
|---|---|---|
| 0.62 | 6.29 | 57.34 |
| 1.04 | 14.57 | 50.80 |
| 2.13 | 27.49 | 39.31 |
| 3.21 | 46.06 | 29.72 |

| Re | η Hybrid System (Night) | Surface Losses |
|---|---|---|
| 0.62 | 46.72 | 53.28 |
| 1.04 | 56.89 | 43.11 |
| 2.13 | 70.1 | 29.9 |
| 3.21 | 79.71 | 20.29 |

SYSTEMS AND METHODS FOR FULL SPECTRUM SOLAR THERMAL ENERGY HARVESTING AND STORAGE BY MOLECULAR AND PHASE CHANGE MATERIAL HYBRIDS

CROSS-REFERENCE TO RELATED APPLICATIONS

This application claims the benefit of and priority to U.S. Provisional Patent Application Ser. No. 62/866,794, filed on Jun. 26, 2019, the entire contents of which is incorporated by reference herein.

TECHNICAL FIELD

The present disclosure relates to solar energy harvesting. More specifically, the present disclosure relates to full spectrum solar thermal energy harvesting and storage by molecular and phase change material hybrids, in which the molecular and phase change hybrid combines the concepts of molecular energy storage and latent heat storage to capture the full solar spectrum for long term operation, both during the day and night cycles.

SUMMARY

An aspect of the present disclosure provides an apparatus for solar thermal harvesting and collection, the apparatus includes an enclosure and a tube. The enclosure includes a bottom layer, a middle layer disposed on the bottom layer, and a top layer disposed on the middle layer. The tube is configured to connect the bottom layer and the top layer.

In an aspect of the present disclosure, the bottom layer may include a phase change material configured to absorb full spectrum solar radiation.

In another aspect of the present disclosure, the middle layer contains an insulating material.

In yet another aspect of the present disclosure, the top layer may include a molecular storage material configured to absorb full spectrum solar radiation.

In a further aspect of the present disclosure, the tube is configured to transfer heat between the bottom layer and the top layer.

In yet a further aspect of the present disclosure, the tube may include a heat transfer fluid.

In an aspect of the present disclosure, the tube may be configured to harvest heat out of the apparatus.

In another aspect of the present disclosure, the phase change material may include a solid phase change material.

In yet another aspect of the present disclosure, energy may be released during a phase transition of the solid phase change material into a liquid phase change material.

In a further aspect of the present disclosure, the molecular storage material may include norbornadiene-quadricyclane.

An aspect of the present disclosure provides a method for solar thermal harvesting and collection. The method includes storing a first heat in a phase change material in the presence of solar radiation based on absorbing full spectrum solar radiation, harvesting a second heat from the phase change material in the presence of solar radiation, storing molecular energy in a molecular storage material in the presence of solar radiation based on absorbing full spectrum solar radiation, transferring the second heat from the phase change material to the molecular storage material in the absence of solar radiation, and harvesting the molecular energy released by the molecular storage material.

In an aspect of the present disclosure, the second heat may be transferred out of the phase change material through a heat transfer fluid.

In another aspect of the present disclosure, the molecular storage material may be configured to isomerize a parent molecule into a child molecule upon exposure to full spectrum solar radiation.

In yet another aspect of the present disclosure, the child molecule includes a higher energy state than the parent molecule.

In a further aspect of the present disclosure, the second heat is transferred from the phase change material to the molecular storage material through a heat transfer fluid.

In yet a further aspect of the present disclosure, the method may further include isomerizing the child molecule into the parent molecule thereby releasing molecular energy, by heat from the heat transfer fluid.

In an aspect of the present disclosure, the phase change material may include a solid phase change material.

In another aspect of the present disclosure, the method may further include transforming the solid phase change material into a liquid phase change material.

In yet another aspect of the present disclosure, the method may further include storing, in the liquid phase change material, latent heat absorbed from full spectrum solar radiation.

An aspect of the present disclosure provides an apparatus for solar thermal harvesting and collection. The apparatus includes an enclosure. The enclosure includes: a bottom layer, a middle layer disposed on the bottom layer, a top layer disposed on the middle layer, an anti-reflective glass disposed on a top surface of the top layer, a tube that is configured to connect the bottom layer and the top layer, a first valve, and a second valve. The bottom layer includes a phase change material and is configured for storing heat in a phase change material in the presence of solar radiation, based on absorbing full spectrum solar radiation. The middle layer including silica aerogel. The top layer includes a molecular storage material. The anti-reflective glass is configured to permit the transmission of full spectrum solar radiation. The tube includes a heat transfer liquid. The first valve is disposed on the tube and when actuated provides for thermal communication between the top layer and the bottom layer. The second valve is disposed on a portion of the tube connected to the bottom layer. The second valve, when actuated, provides for the harvesting of the stored heat.

Further details and aspects of exemplary embodiments of the present disclosure are described in more detail below with reference to the appended figures wherein like reference numerals identify similar or identical elements.

BRIEF DESCRIPTION OF THE FIGURES

A better understanding of the features and advantages of the disclosed technology will be obtained by reference to the following detailed description that sets forth illustrative embodiments, in which the principles of the technology are utilized, and the accompanying figures of which.

DETAILED DESCRIPTION

Figure 1A:
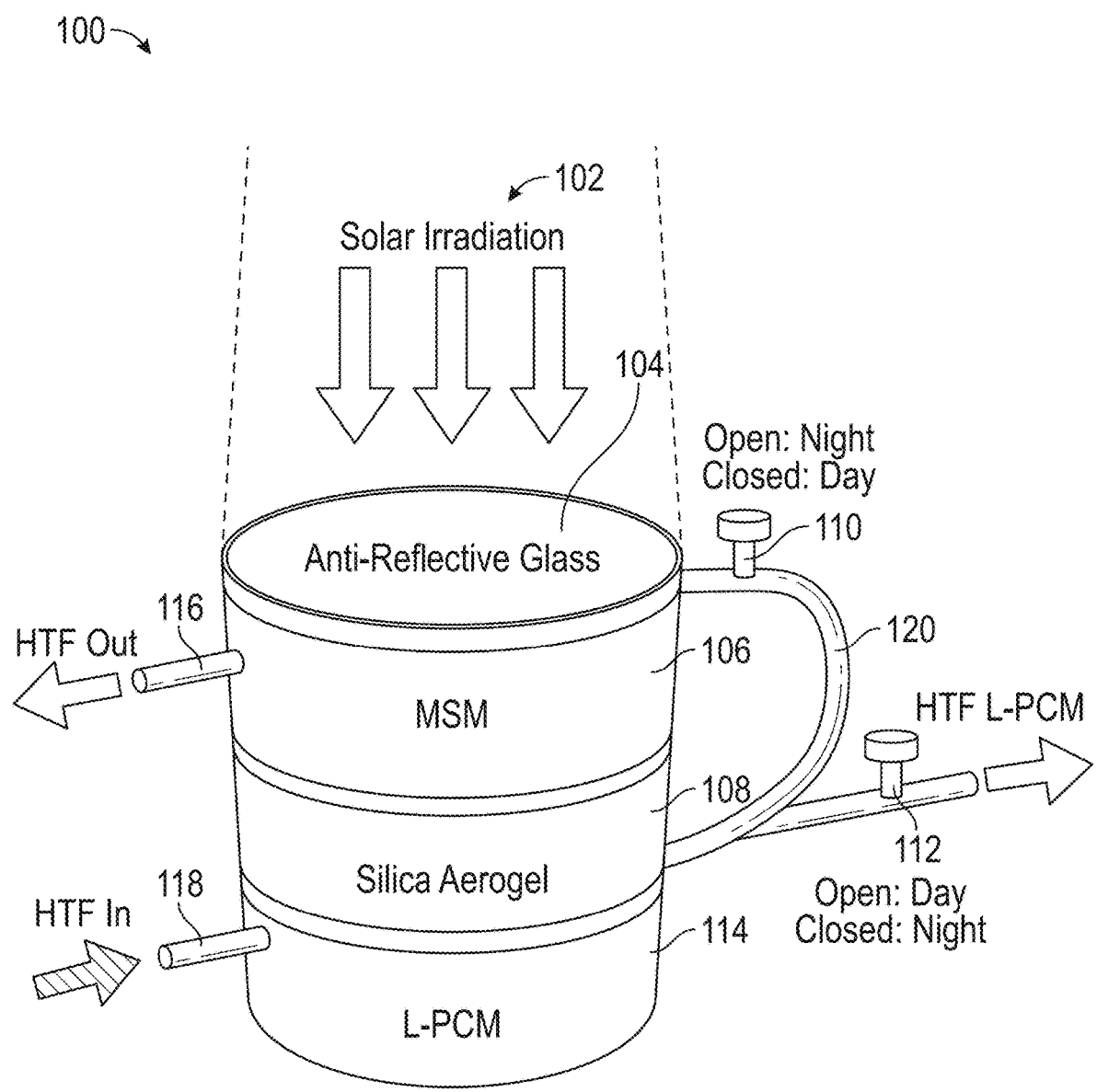
FIGS. 1A-D are diagrams that illustrate full spectrum solar thermal energy harvesting and storage, in accordance with the present disclosure.

This disclosure relates to systems and methods for full spectrum solar thermal energy harvesting and storage by molecular and phase change material hybrids.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the figures, and specific language will be used to describe the same. It will nevertheless be understood that no limitation of the scope of the present disclosure is thereby intended. Any alterations and further modifications of the features illustrated herein, and any additional applications of the principles of the present disclosure as illustrated herein, which would occur to one skilled in the relevant art and having possession of this disclosure, are to be considered within the scope of the present disclosure.

Efficient solar thermal energy harvesting and storage is a critical step towards utilization of the abundant solar irradiation on the earth's surface. Current solar-thermal approaches rely on costly high optical concentration systems resulting in high heat losses by hot bulk materials and surfaces. At the same time, the energy stored in the form of thermal energy has inherently large temporal losses. An aspect of the present disclosure combines the physics of molecular energy and latent heat storage to provide an integrated harvesting and storage molecular and phase change hybrid apparatus and method for 24/7 energy delivery. In various aspects, the molecular and phase change hybrid apparatus and method included in the present disclosure utilize heat localization during the day to provide a harvesting efficiency of approximately 73% at small-scale and approximately 90% at large-scale. Further, at night, the stored energy by the molecular and phase change hybrid apparatus is recovered with an efficiency of approximately 80% and at a higher temperature than that of the day, in contrast to all the state-of-the-art systems. Various aspects of the integrated hybrid concept and system allow for simultaneous harvesting and storage of solar-thermal energy for a wide range of applications, including, but not limited to, power-generation, desalination, and distillation.

The three main approaches employed for solar energy conversion include solar-electric approaches (i.e., photovoltaics), solar-thermal energy approaches (i.e., power generation), and solar water splitting (i.e., $H_2$ production). Most current technologies utilize separate infrastructures for harvesting and storage of energy. Therefore, the heat transfer fluid must circulate between both these infrastructures to store energy. The metrics for solar thermal energy harvesting may include efficiency and operating temperature, while for storage technologies, the metrics may include energy density (MJ/m$^3$), specific energy (MJ/kg), and operating temperature. These storage media can be broadly classified into two groups: thermophysical storage (i.e., sensible heat storage and latent heat storage) and thermochemical storage. Thermophysical energy storage media have high thermal stability at high operating temperatures but suffer from low energy densities. Thermochemical storage technologies utilize endothermic and exothermic chemical reactions to store solar thermal energy. Although these systems have high energy densities, their drawbacks include weak long-term durability, low chemical stability, and use of complicated reactors for specific chemical reactions. In another exemplary method called molecular energy storage, the parent photoswitchable molecule absorbs sunlight and undergoes photoisomerization to transform into a molecule with a higher energy state. The isomerization process, in which one molecule changes into a different molecule while maintaining the same atoms, stores energy within the bonds of the molecule as enthalpy. The absorbed energy can then be released either by using a catalyst or with heat to isomerize back to the parent molecule. This allows for chemical energy to be stored in a compact way without need for thermal insulation. Several photoisomers have been identified and may be used for molecular energy storage, including anthracene, difulvalenediruthenium complexes, dihydroazulene/vinylheptafulvene, Dewar isomers of azaborinine derivatives, azobenzene, and norbornadiene-quadricyclane (NBD-QC). Among the aforementioned, the NBD-QC system has proven to be a promising material due to its high specific energy (0.4 MJ/kg), long storage times ($t_{1/2}$=30 days at 25° C.), and exceptional heat release. Isomerization in the NBD-QC system may be triggered using a UV light source, and a catalyst (e.g., cobalt phthalocyanine on a carbon support) may be used to trigger the back-isomerization (QC-NBD) reaction for energy release under a vacuum condition. However, no solar energy harvesting and release is demonstrated for these materials.

The present disclosure includes a system and method of a molecular and phase change molecular and phase change hybrid apparatus that combines the concepts of molecular energy storage and latent heat storage to capture the full solar spectrum for long term operation, both during the day and night cycles. The physics of heat localization may be employed in various embodiments of the hybrid material to obtain the required phase change temperature at low solar concentrations. During the day, the heat from the localized phase change material (L-PCM) may be harvested by the heat transfer fluid (HTF) with approximately 73% efficiency, at small scale, while the molecular storage material (MSM) captures the UV radiation from the solar spectrum, as shown in FIG. 1A. At night, heat from both the L-PCM and MSM may be harvested by the HTF with approximately 80% efficiency. Furthermore, the energy that may be used for the thermal back-isomerization of the MSM material may be provided by the L-PCM.

FIG. 1A is an exemplary illustration of a molecular and phase change hybrid apparatus 100. The molecular and phase change hybrid apparatus 100 generally includes a bottom layer 114, a middle layer 108 disposed on the bottom layer, a top layer 106 disposed on the middle layer 108, and a tube 120 that is configured to connect the bottom layer 114 and the top layer 16. The bottom layer 114 includes a localized phase change material (L-PCM) configured to absorb full spectrum solar radiation 102. The middle layer 108 contains an insulating material (e.g., silica aerogel). The top layer 106 includes a molecular storage material (MSM) configured to absorb full spectrum solar radiation 102. The tube includes a heat transfer fluid and is configured to transfer heat between the bottom layer and the top layer. For example, the MSM and the L-PCM are separated by a silica aerogel to maintain the necessary temperature difference. The molecular and phase change hybrid apparatus 100 may further include a first valve configured to allow thermal communication between the top layer and the bottom layer. The molecular and phase change hybrid apparatus 100 may further include a second valve.

The molecular and phase change hybrid apparatus 100 may be composed of a molecular storage material (MSM) and a localized phase change material (L-PCM) to achieve full spectrum solar energy harvesting and storage to provide thermal energy both during the day and at night. During the day, the first valve 110 may be closed and the second valve 112 may be opened, and the bottom layer 114 (e.g., the L-PCM), may absorb the incident solar irradiation 102 and undergo a solid-liquid phase transition. Solar heat localization may be employed to reach the phase transition temperature at low solar flux to minimize heat loss. Carbonized Rayon (CR), which has high absorption (>97%) in the solar spectrum, may be introduced in the phase change material (PCM) to localize the heat and create a hot spot in the material structure. To minimize radiation losses from the top surface of L-PCM, the L-PCM may be covered with a bulk silica aerogel layer, which may be transparent in the solar spectrum and opaque in the infrared spectrum. Furthermore, the silica aerogel may allow for a constant temperature difference to exist between the L-PCM and MSM, a component for daytime functionality of the hybrid system. Heat may be stored in the L-PCM in the form of latent heat. Via the tube 120, a heat transfer fluid (HTF) may be flowed through the L-PCM to harvest the stored energy. The MSM of the top layer 106 may be composed of a photoisomer. During the day, the photoisomer may absorb UV radiation to beget isomerization of the MSM while at the same time storing energy. Low temperature (<about 70° C.) may be used during the harvesting of UV radiation by the photoisomer to maximize efficiency. During the night, the second valve 112 would be closed, the first valve 110 would be open, and HTF from the L-PCM, which is at the phase transition temperature, flows to the MSM to provide the necessary threshold temperature to initiate the thermal back-isomerization; this process releases the stored energy from the UV radiation. Thus, the molecular and phase change hybrid apparatus 100 may absorb the complete solar spectrum and provides thermal energy both during the day and night (24/7). A salient feature of this molecular and phase change hybrid apparatus 100 is the higher harvesting temperature at night compared to daytime temperatures, which is an inherent advantage to state-of-the-art systems.

Figure 1B:
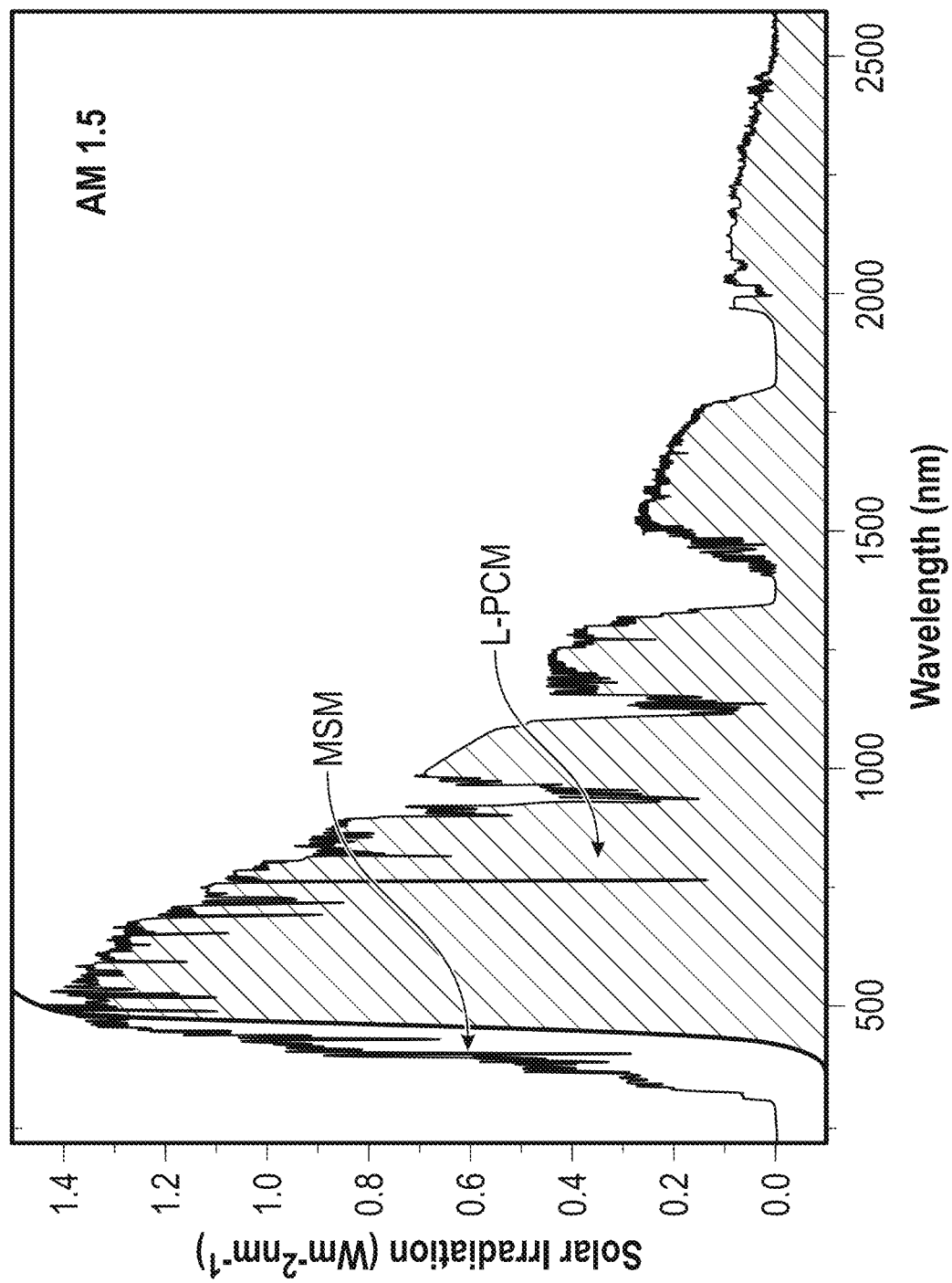

FIG. 1B illustrates the wavelengths of the solar spectrum captured by MSM and L-PCM. In an exemplary model of this general concept, the present disclosure includes using a combination $KNO_3$, $NaNO_3$, and $LiNO_3$ as the PCM and a norbornadiene (NBD)-quadricyclane (QC) system as the MSM material. In various aspects of the present disclosure, a combination of $KNO_3$, $NaNO_3$, and $LiNO_3$ may be used due to its high energy density and low melting point (~120° C.), which may be achieved under low solar flux. In various embodiments, an NBD-QC system may be chosen due to its high specific energy (about 0.4 MJ/kg). In the present disclosure, the exemplary combination of PCM and MSM may be used to illustrate the concept of a molecular and phase change hybrid system. However, the system disclosed in the present disclosure is not limited to the aforementioned combination, and furthermore, any combination of PCM and MSM may be used in this hybrid system.

Figure 1C:
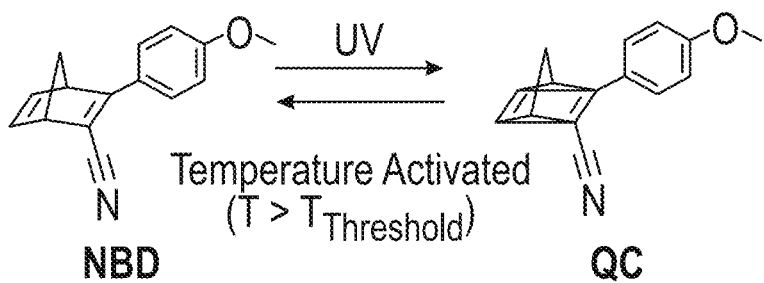
Figure 1C:
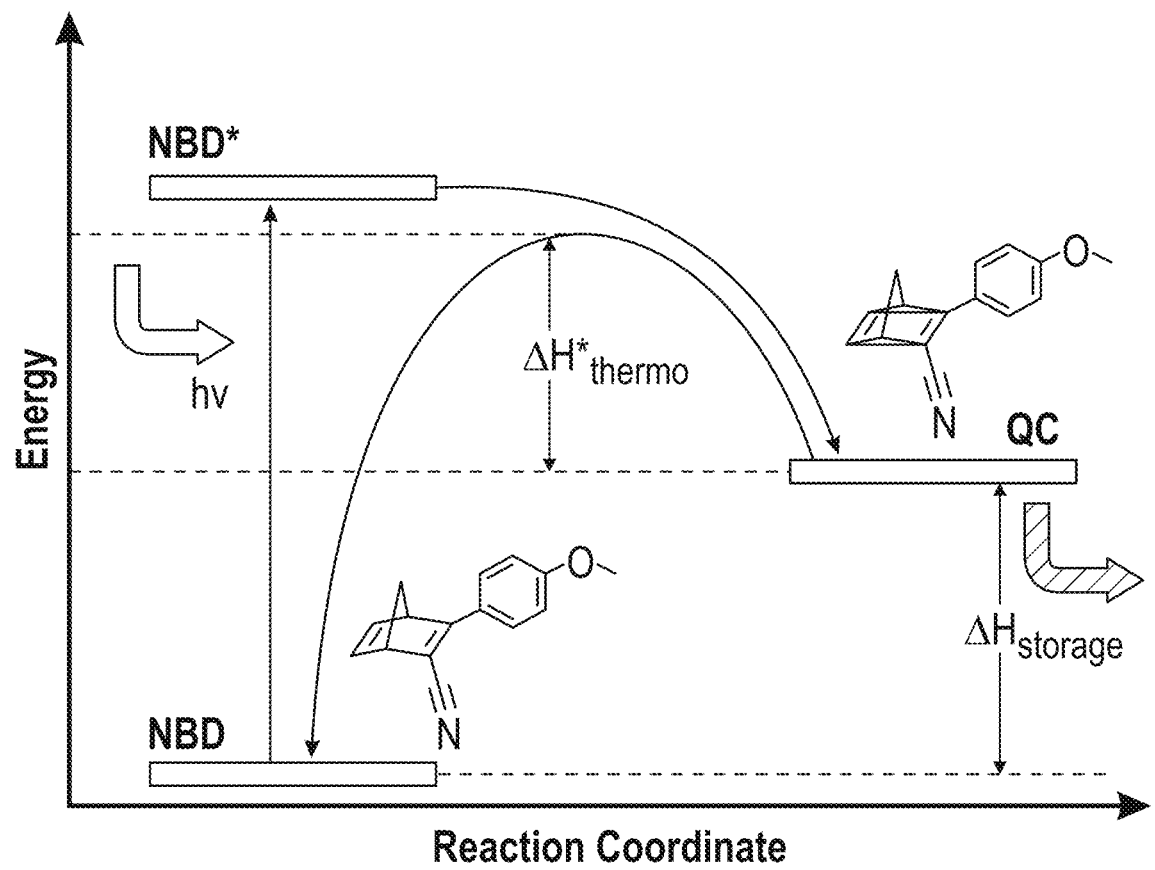

FIG. 1C illustrates an exemplary reaction energy diagram for photoisomerization of the NBD-QC system. Conversely, QC, on thermal initiation, isomerizes back to the parent molecule and releases the absorbed energy. In various aspects, norbornadiene (NBD) may undergo photoisomerization to quadricyclane (QC) on exposure to UV radiation and may undergo back-isomerization on thermal initiation.

Figure 1D:
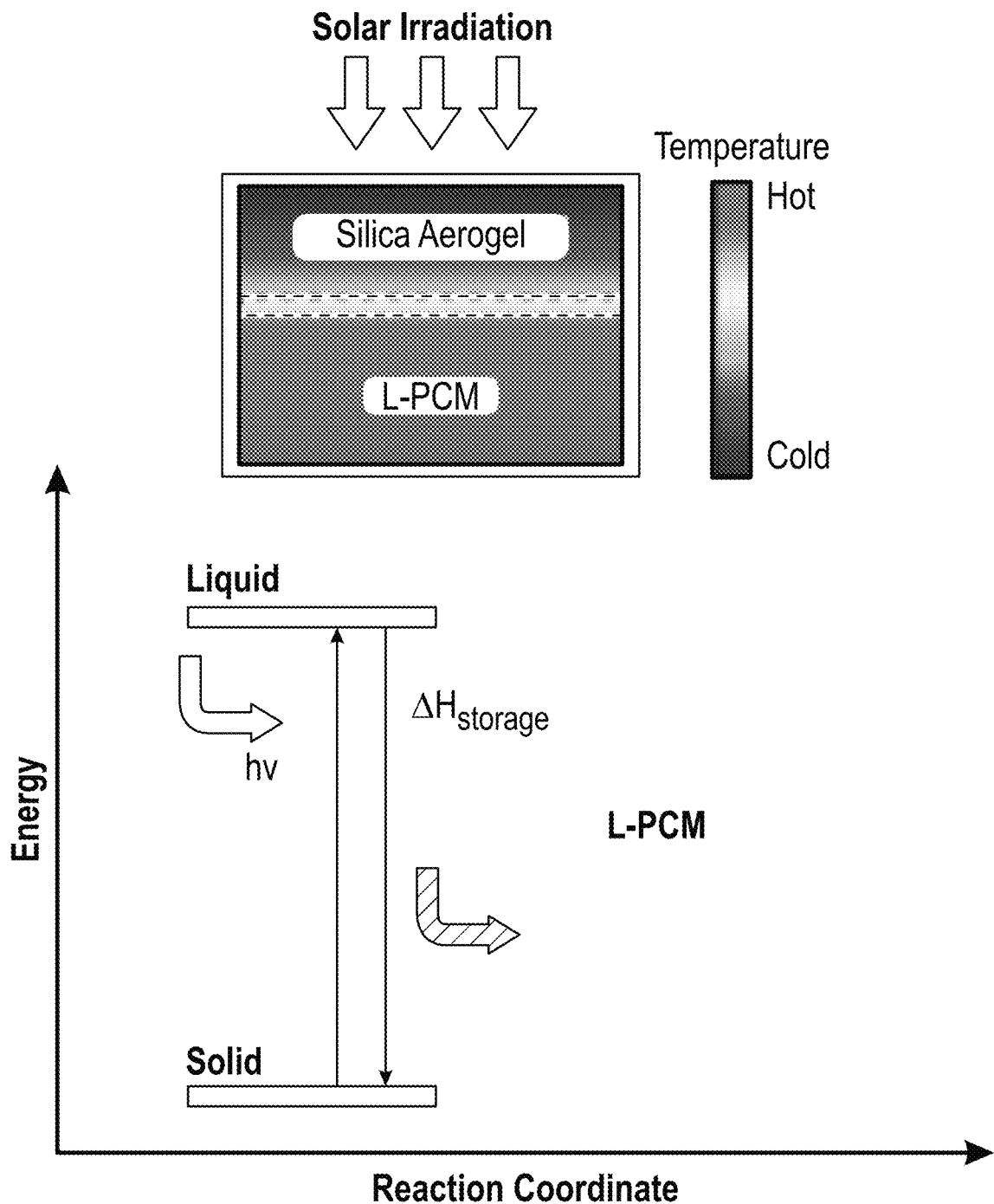

FIG. 1D illustrates the change in enthalpy attributed to the phase change, which may be released as energy during the phase transition of the L-PCM from liquid to solid. In various aspects of the present disclosure, the energy may be stored in the form of enthalpy. With reference to FIG. 1D, energy storage in the L-PCM, which may occur through a solid-liquid phase change, is shown. In accordance with the present disclosure, the temperature gradient in the L-PCM and the silica aerogel layer may also be shown for reference. Specifically, the L-PCM may localize incident solar irradiation, generating a hot spot, and the silica aerogel preserves the required low temperature (<70° C.) on the surface. This ensures that the MSM is always below the threshold temperature to harvest UV radiation during the day without initiating back-isomerization.

Figure 2A:
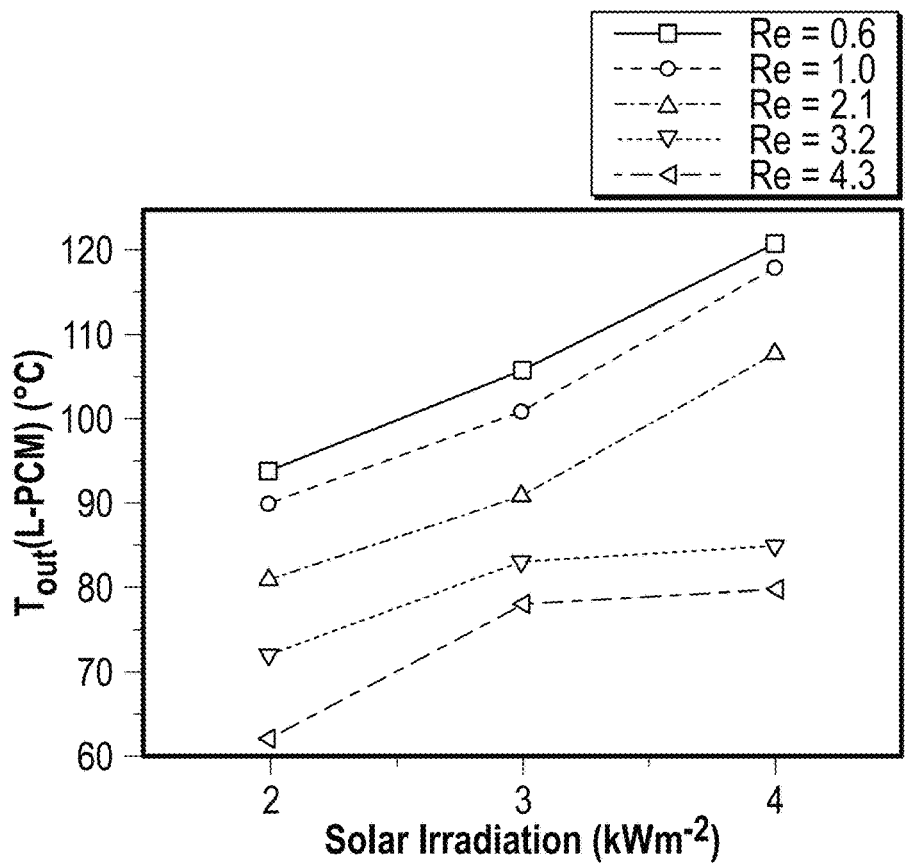
FIGS. 2A-D are diagrams that illustrate solar thermal energy harvesting during the day, in accordance with the present disclosure.
Figure 2B:
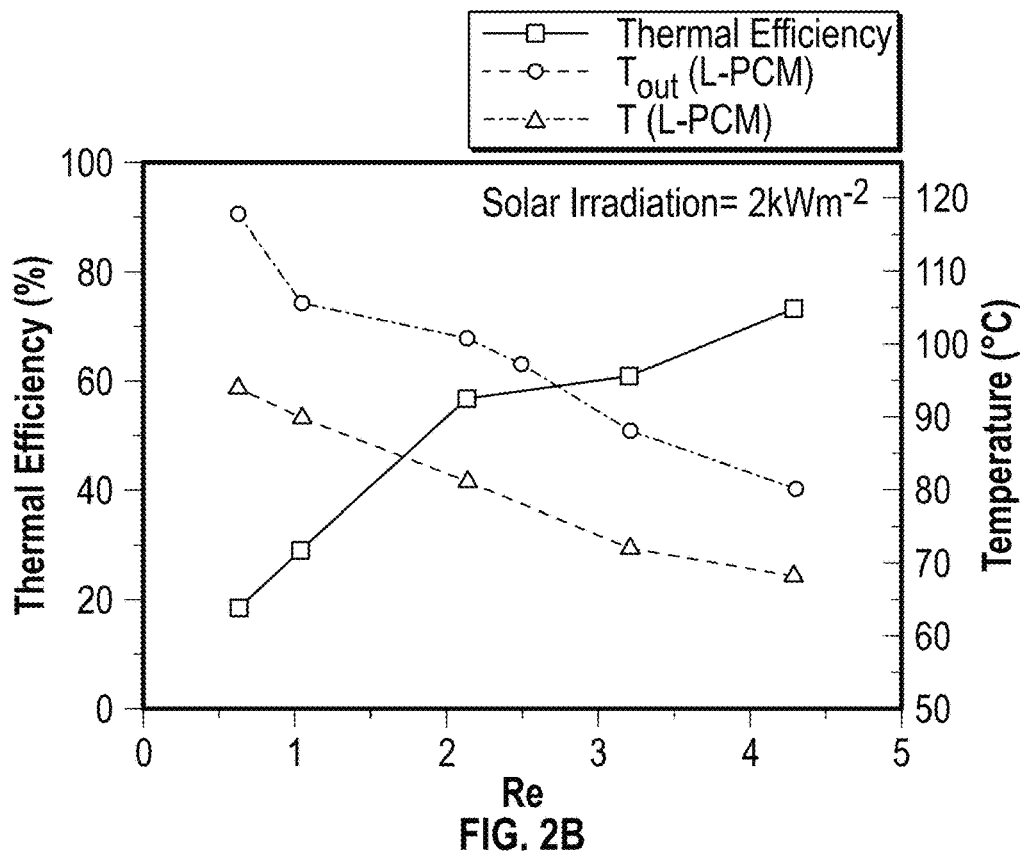
Figure 8A:
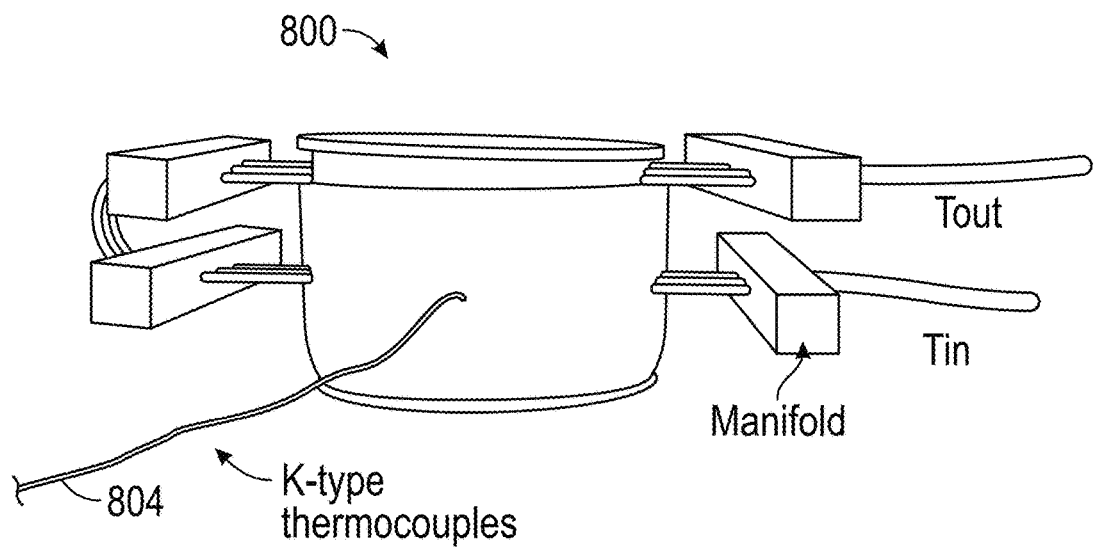
FIGS. 8A and B are a perspective view of a molecular and phase change hybrid system, in accordance with the present disclosure.
Figure 8B:
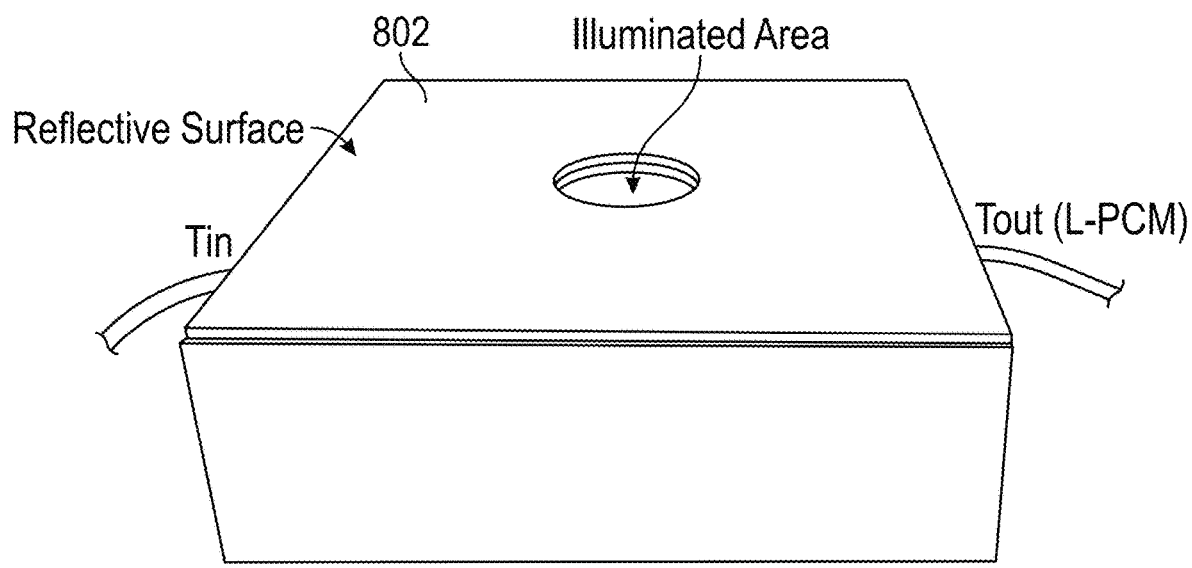

With reference to FIGS. 2A-D, the daytime performance of the molecular and phase change hybrid apparatus 100 towards harvesting energy, is shown in accordance with the present disclosure. The experimental setup used, as referenced in FIGS. 2A-D, is shown in FIGS. 8A and 8B. The HTF enters the system at ambient temperature (Tin). The output temperature from L-PCM, Tout (L-PCM), is a function of the Reynolds number (Re) of flow of the HTF. FIG. 2A shows Tout (L-PCM) as a function of solar irradiation and the Reynolds number. Tout (L-PCM) increases as the Reynolds number decreases, and solar irradiation increases. FIG. 2B shows the thermal efficiency of the L-PCM as a function of the Reynolds number and is given by $$\eta = \frac{\dot{m}C_p \Delta T}{\tau Q_{in}}$$

where $\dot{m}$ is the mass flow rate of the HTF in $kgs^{-1}$, $C_p$ is the specific heat of the HTF used (silicone oil) in $Jkg^{-1}$, $\Delta T$ is the temperature difference between $T_{in}$ and $T_{out}$ (L-PCM) in K, t is the transmission across three glasses (including one anti-reflective glass and the silica aerogel monolith), and $Q_{in}$ is the illuminated solar irradiation in W. As shown in FIG. 2B, thermal efficiency increases as a function of the Reynolds number for a fixed solar irradiation. For 2 $kWm^{-2}$ solar irradiation, a thermal efficiency of approximately 73% may be obtained during the day for a small-scale system.

Figure 2C:
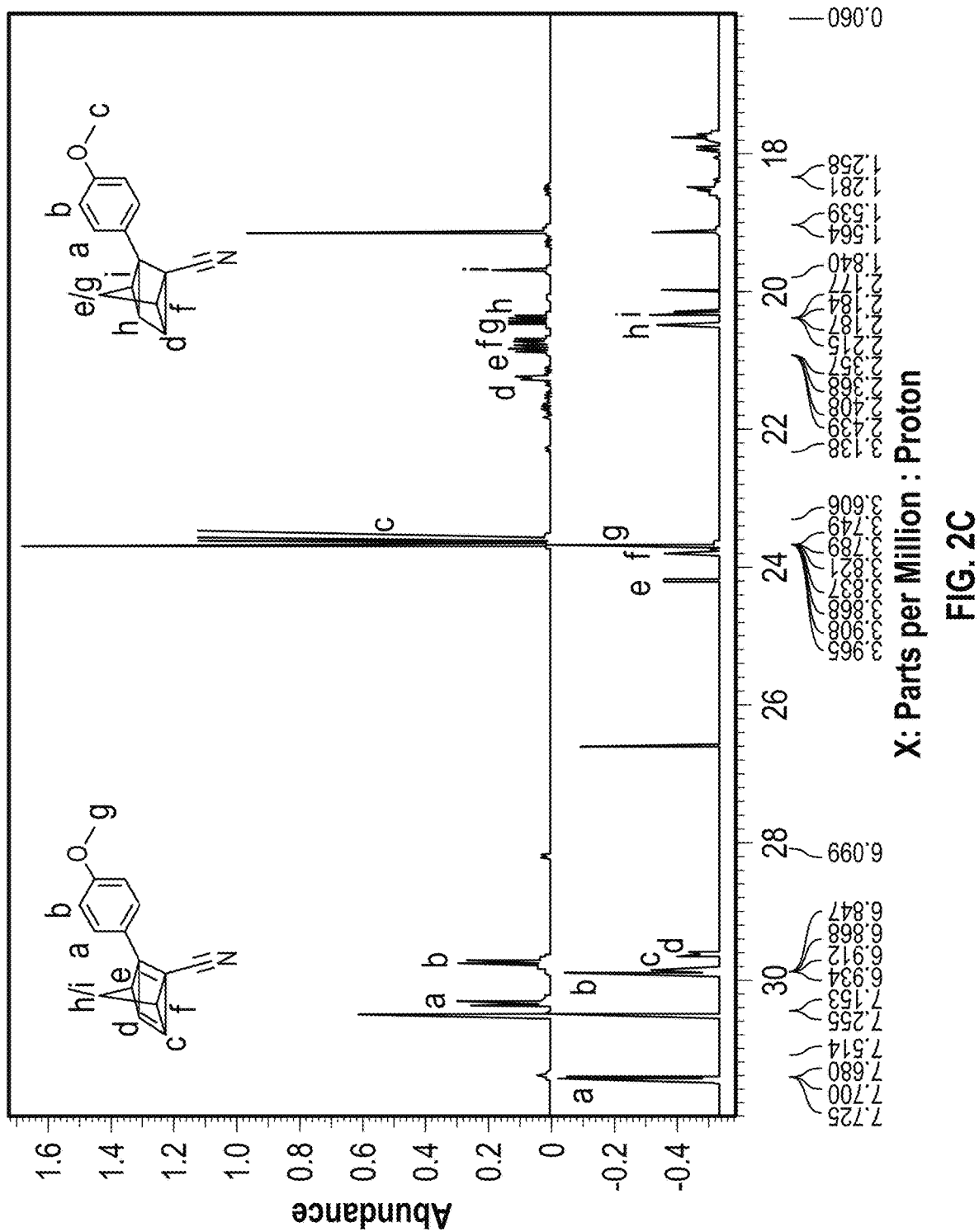
Figure 2D:
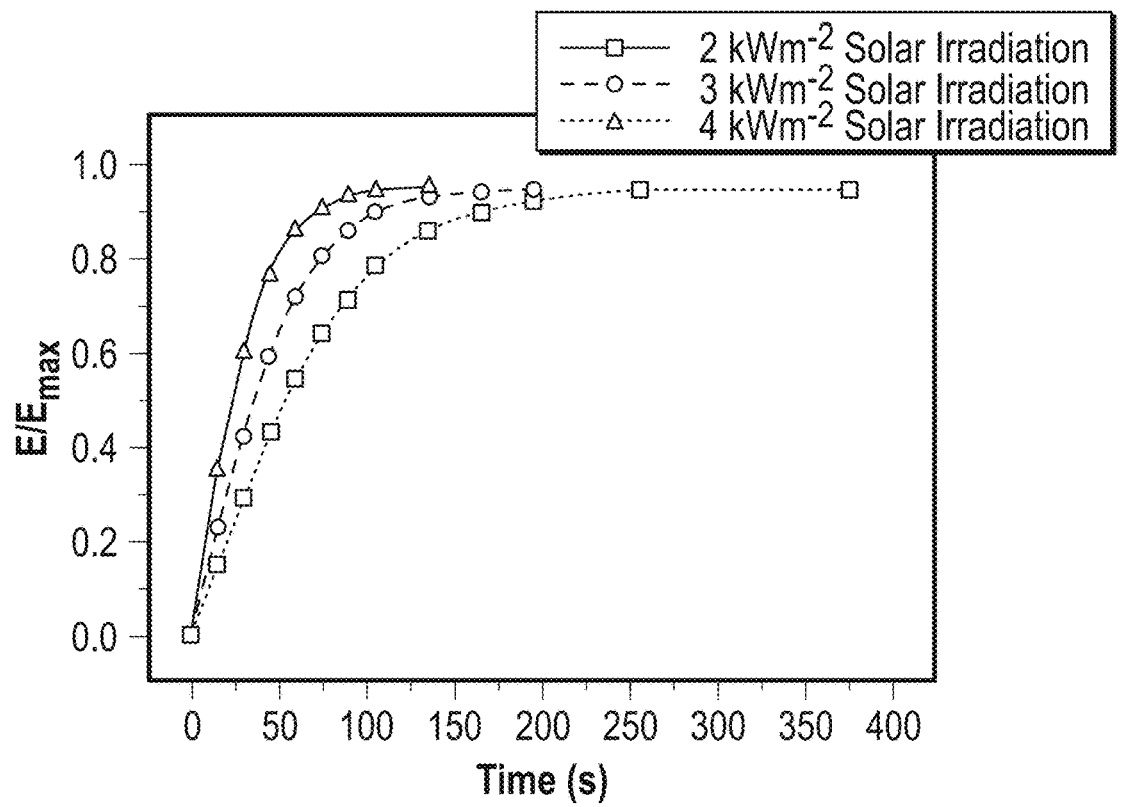

FIG. 2A illustrates $T_{out}$ (L-PCM) as a function of solar concentration and Reynolds number for HTF flow. FIG. 2B illustrates thermal efficiency for solar thermal energy harvesting during the day as a function of surface temperature of the PCM and Reynolds number for HTF flow. FIG. 2C illustrates the proton NMR spectra showing complete conversion of NBD to QC under UV radiation. FIG. 2D illustrates transient change in energy stored by the MSM during photoisomerization of NBD to QC under different solar.

To confirm complete isomerization of NBD to QC in the presence of UV light (300-370 nm) in solution, H-NMR spectroscopy may be performed before and after irradiation, as shown in FIG. 2C. The MSM may be dispersed in toluene since the photoisomer exhibits good ambient stability in toluene ($t_{1/2}$=30 days at 25° C.). The conversion may occur through the photosensitized cyclization of NBD via a [2+2] intramolecular cyclization. In order to prove the existence of NBD and QC, separately, both compounds may be characterized with the H-NMR spectroscopy. In various aspects, the peaks unique to NBD, originating from the double bond, at approximately 6.92 (FIG. 2C) and approximately 6.82 (FIG. 2D) may disappear from the NMR spectrum after irradiation of the sample and conversion to QC. This result indicates that almost all of the NBD compound may be converted to QC and the UV radiation in the solar spectrum may be successfully harvested by MSM which may be the top layer of the hybrid system. The transient change may be stored energy stored by the MSM, as shown in FIG. 2D of the present disclosure, and may be measured by conversion of NBD-QC using UV-Visible spectroscopy. The time for NBD to isomerize to QC may be shorter at high solar irradiations compared to low solar irradiation. For example, at a solar irradiation of 3 $kWm^{-2}$, complete isomerization to QC may be seen in approximately 200 seconds for MSM at a concentration of 0.00005M. Further, complete isomerization to QC may be seen in approximately 125 seconds at 4 $kWm^{-2}$ and in approximately 375 seconds at 2 $kWm^{-2}$.

Figure 3A:
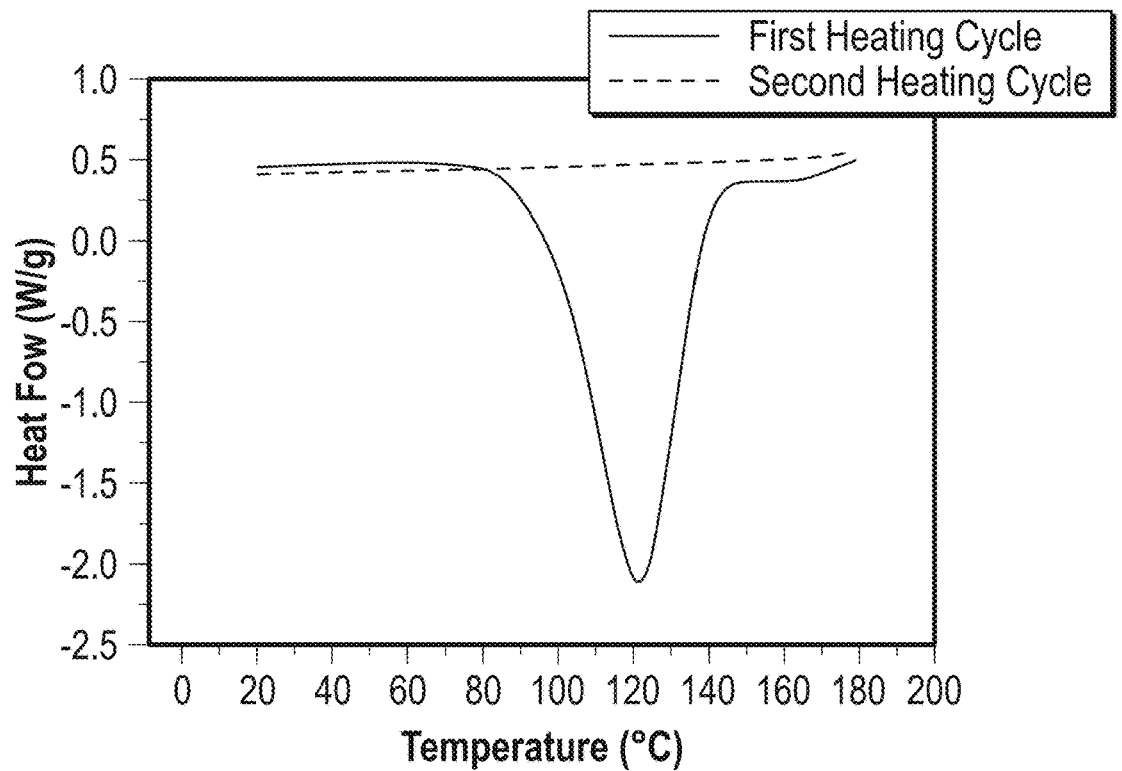
FIGS. 3A-D are diagrams that illustrate thermal energy storage by molecular phase change hybrid, in accordance with the present disclosure.
Figure 11:
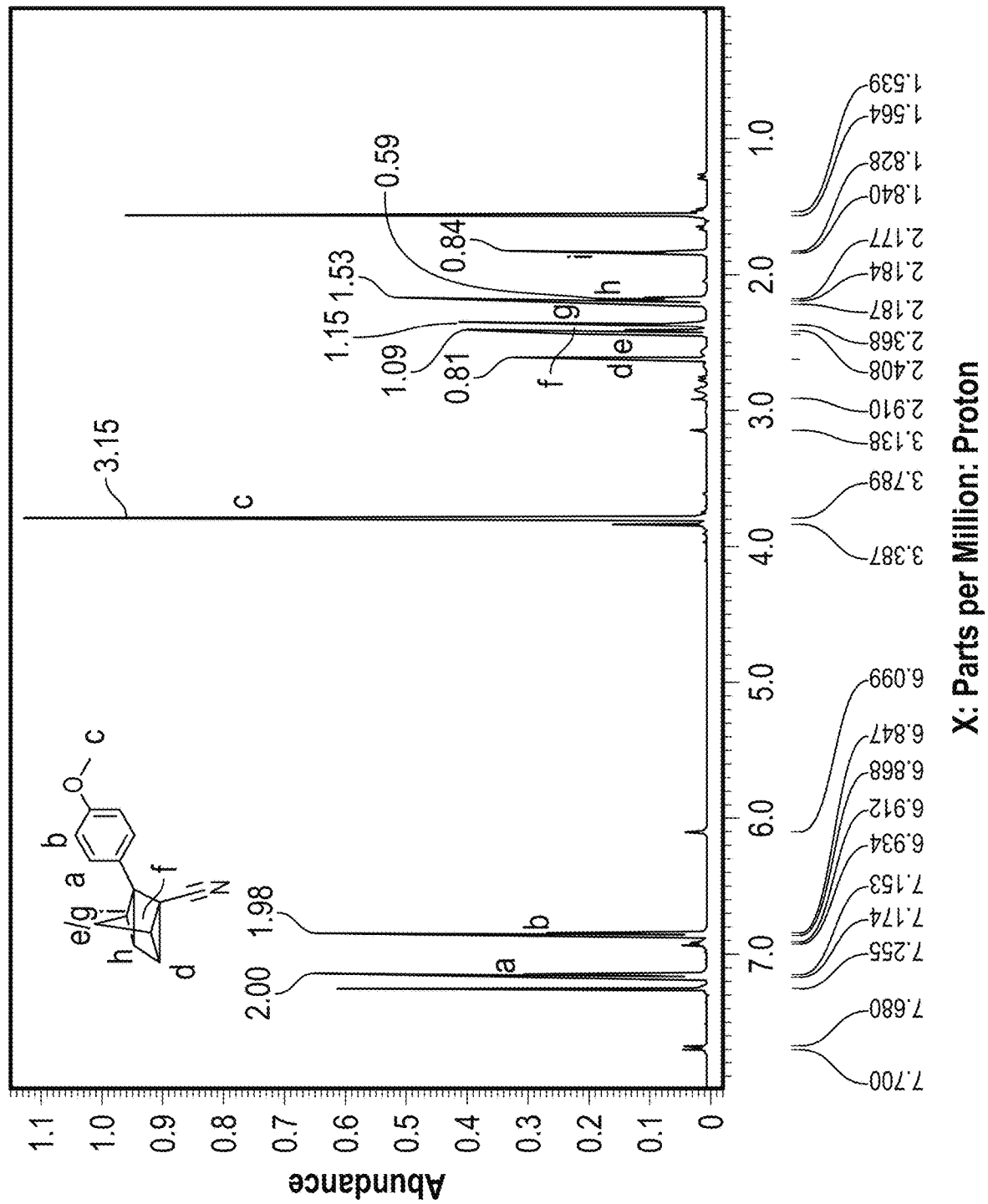
FIG. 11 is a diagram that illustrates an NMR spectrum, in accordance with the present disclosure.

With reference to FIGS. 3A-D, exemplary evaluations of the solar thermal energy storage capabilities of the individual MSM and L-PCM along with the molecular phase change molecular and phase change hybrid apparatus 100 are shown. In various aspects, differential scanning calorimetry (DSC) may be conducted on QC, as shown in FIG. 3A. In various aspects, QC samples may be prepared by exposing a toluene solution of NBD to 365 nm UV light. In various aspects, the volatile toluene solution may be evaporated and complete conversion to QC may be confirmed by NMR prior to conducting the DSC, as shown in FIG. 11. DSC may be conducted for two continuous heating cycles, for example, from about 40° C. to about 180° C.

With reference to FIG. 3A, an exemplary DSC thermogram for the thermal back conversion of QC to NBD, is shown in accordance with the present disclosure. The solid line represents the first heating cycle, and the dashed line represents the second heating cycle. During the first heating cycle, as shown by the continuous line in FIG. 3A of the present disclosure, heat release may be observed at approximately 85° C.

Figure 3B:
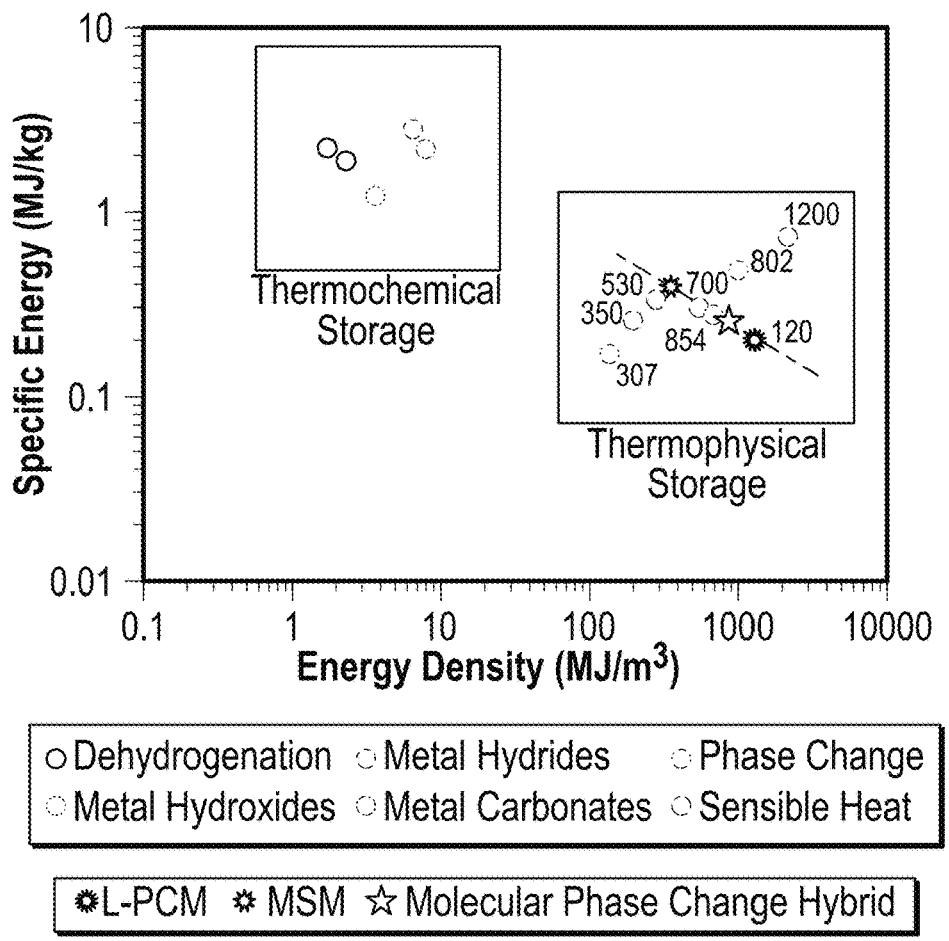

FIG. 3B illustrates a comparison of exemplary storage capacities of state-of-the-art energy storage materials, including thermochemical and thermophysical storage mechanisms, and the system of the present disclosure. The energy density vs. specific energy diagram in the present disclosure may be considered as the figure of merit for the assessment of energy storage materials. As discussed above herein, the ideal energy storage material may have high energy density and specific energy. Furthermore, the phase change temperatures of various materials are also indicated in FIG. 3B. In order to illustrate the applicability of the presently disclosed hybrid molecular and phase change system, for example, a PCM with a phase transition temperature of approximately 120° C. may be used. This temperature may be targeted due to the appeal of low solar concentration and the associated reduced operation costs in comparison to high concentration systems. Any PCM can be used in this system, employing the same concept. The energy and storage metrics of both the MSM and the L-PCM employed in the exemplary study in the present disclosure are indicated in FIG. 3B. As shown in FIG. 3B, the specific energy of the molecular and phase change hybrid may be higher than L-PCM by using a coupled MSM system, thereby proving higher storage capacities of the molecular and phase change hybrid apparatus 100 described in the present disclosure. It may be observed that harvesting the full spectrum of the incident solar irradiation may increase the specific energy.

Figure 3C:
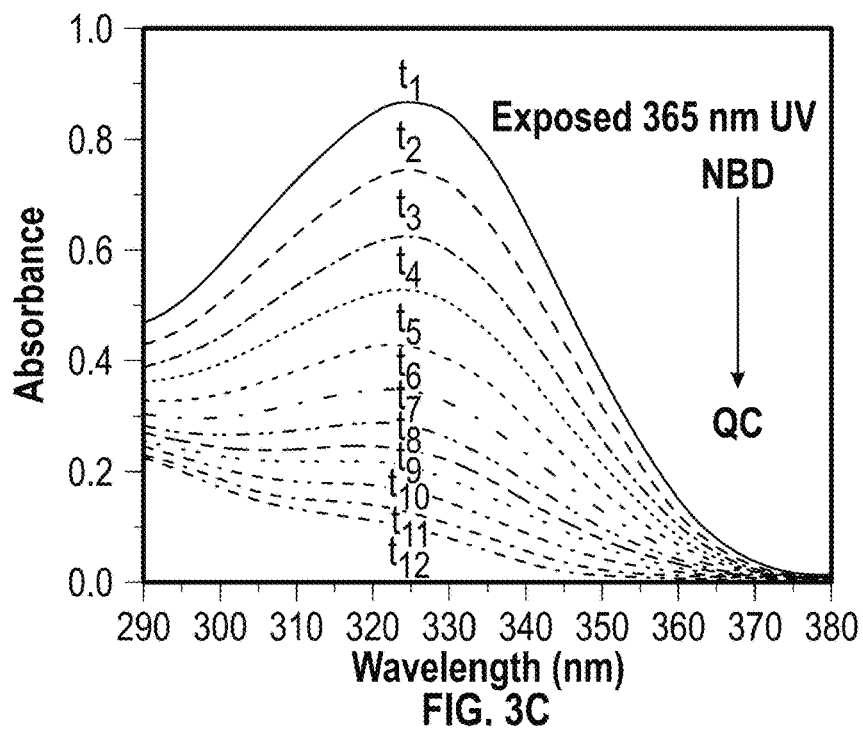
Figure 3D:
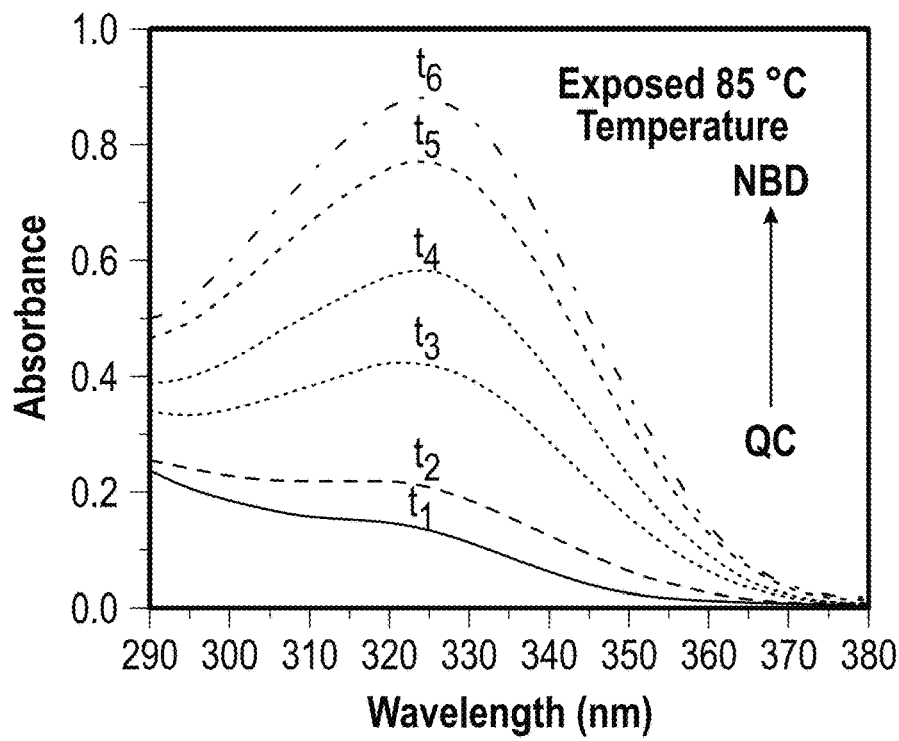

FIG. 3C illustrates the chemical transformation of UV-Visible spectra from NBD (before photoisomerization) and QC (after photoisomerization). FIG. 3D illustrates the chemical transformation of UV-Visible spectra from QC to BBD. For example, experimental energy storage may be shown to be $\Delta H_{storage}$=88 kJ $mol^{-1}$, which may correspond to an energy density of approximately 0.4 MJ $kg^{-1}$. However, during the second heating cycle, no heat release was observed (dashed line in FIG. 3A), thereby indicating the complete conversion of QC to NBD during the first heating cycle.

With continued reference to FIG. 3C and FIG. 3D, the interchangeable formation between NBD and QC is shown in accordance with the present disclosure. The presence of QC may be obtained from the UV-Vis spectroscopy. In various aspects, a structural difference between NBD and QC is the continuous conjugation present in NBD, which includes an aromatic ring, a double bond in a norbornadiene ring, and a nitrile group. This small conjugated system significantly shifts the highest absorbance peak position to a lower absorption wavelength compared to QC. In the smaller conjugation system, more energy is required to excite the π electron in the electronic transition (higher HOMO-LUMO gaps) compared to the larger conjugation system. Thus, after exposure to a UV source, for example, about 365 nm for about 30 seconds, a decrease in the intensity of the peak at 325 nm may be observed. Upon increasing UV irradiation time on NBD, a linearly decreasing trend may be observed. This process may be repeated until the absence of the absorption peak, for example, at approximately 310 nm. The disappearance of the peak at approximately 325 nm ensures the complete transformation of NBD to QC. To reobtain NBD, the reverse chemical transformation may be performed by applying heat to the QC solution. As discussed hereinabove, QC may be reversed back to NBD by thermal initiation. The conversion proceeds through a retro-[2+2] intermolecular cyclization. Upon exposing the QC solution to an approximately 85° C. oil bath, the absorption peak at approximately 310 nm begins to increase in intensity, indicating the formation of the extended conjugation system. This experiment may be continued until there is no further change in the absorbance. The absorbance data before exhibiting photosensitized cyclization and after retro-[2+2] intermolecular cyclization may show similar values, as shown in FIG. 3C.

Figure 4A:
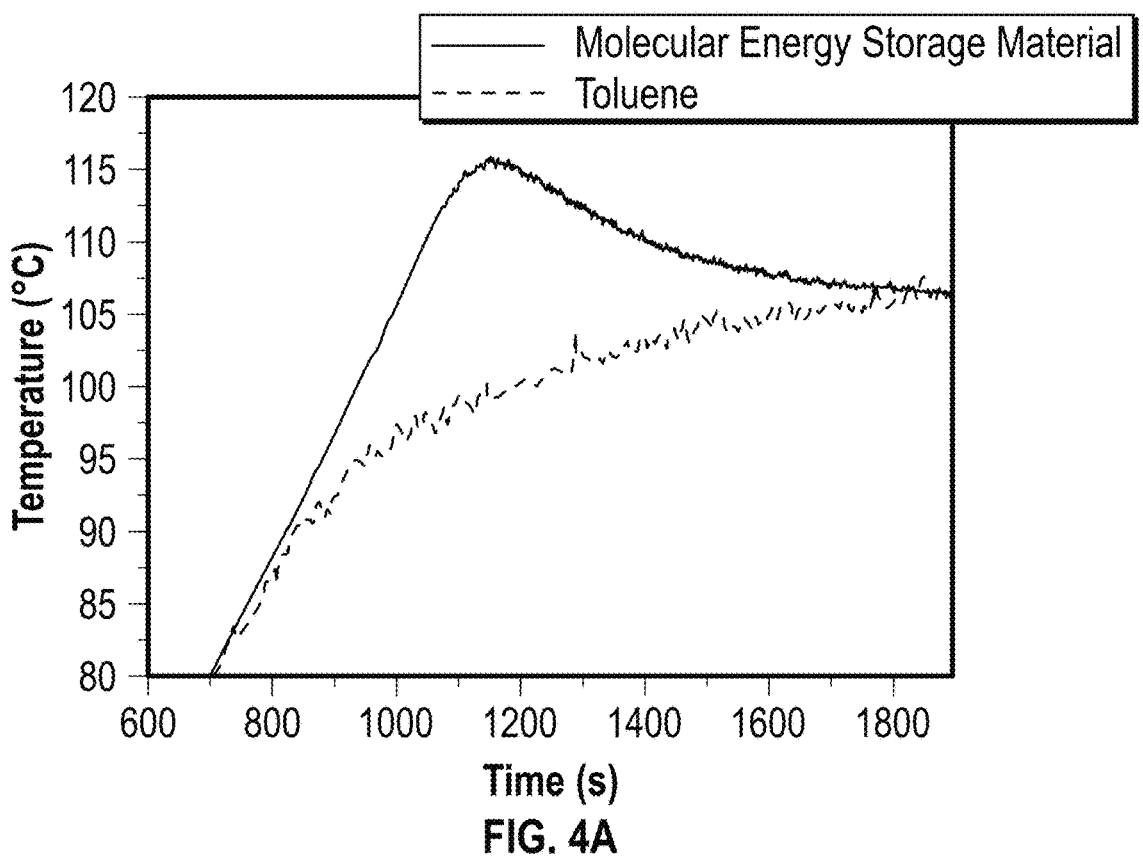
FIGS. 4A-D are diagrams that illustrate full spectrum energy harvesting during night, in accordance with the present disclosure.
Figure 4B:
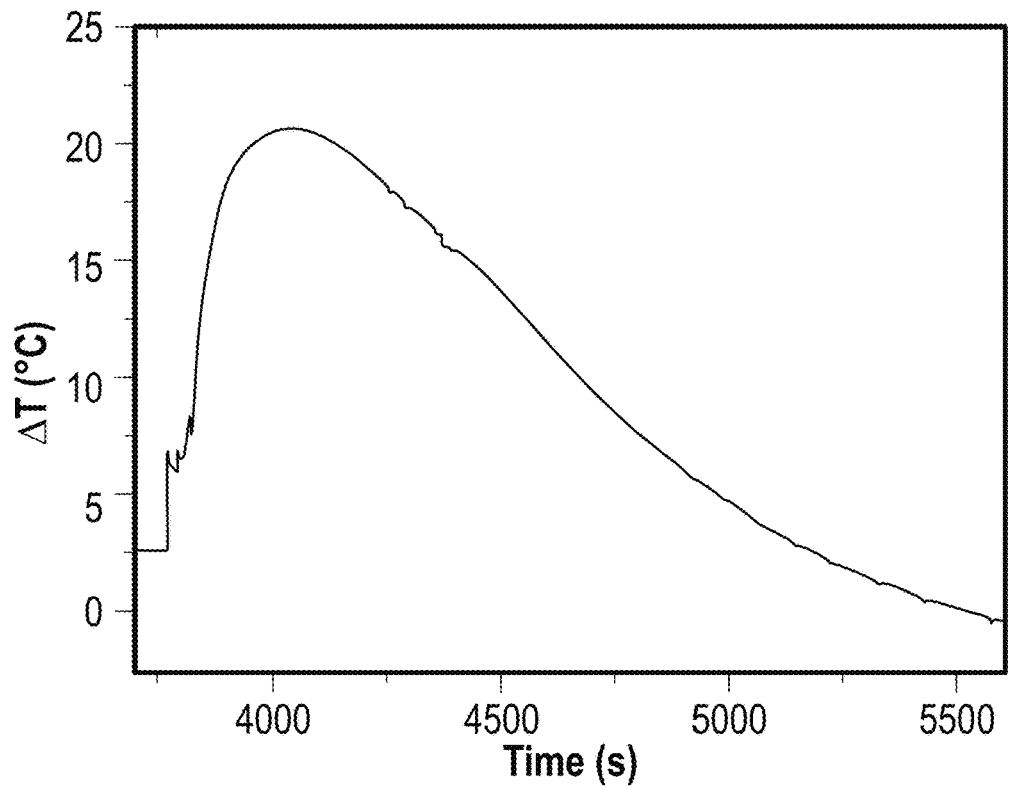

During nighttime operation (no solar irradiation), energy is harvested from both the L-PCM and MSM. During daytime, the L-PCM attains high steady-state temperatures of up to approximately 170° C. and $T_{out}$(L-PCM) of >100° C. This temperature may be higher than the threshold for activation of the MSM for energy release. Once HTF flows through the MSM, the system may harvest the energy stored in it. In order to confirm energy release by the MSM, both the MSM (in the QC state) and pure toluene may be heated to the threshold temperature simultaneously. For example, as shown in FIG. 4A, the MSM may show a temperature jump of about 10° C. to about 15° C., as opposed to pure toluene, which may exhibit a constant temperature increase. These results are consistent with the exemplary heat release shown in FIG. 3A. This property of the MSM may be exploited in the molecular and phase change hybrid apparatus 100 to achieve a high final outlet HTF temperature. For example, the temperature difference between the outlet from L-PCM (Toot (L-PCM)) and the outlet from MSM ($T_{out}$) is shown in FIG. 4B and may correspond to a Reynolds number of approximately 1.04. In various embodiments, the latent heat release from the L-PCM may heat the HTF and elevates its temperature beyond the threshold temperature for the thermal back isomerization of the MSM (QC), which may be >85° C.

With reference to FIGS. 4A-D, diagrams that illustrate full-spectrum solar energy harvesting during night are shown.

FIG. 4A illustrates a comparison between transient heat release of toluene and the MSM (QC) dispersed in toluene. As shown, a clear temperature jump may be seen in the case of toluene. FIG. 4B illustrates the transient temperature difference between the HTF outlet from the L-PCM and the outlet from the MSM for a Reynolds number of 1.04. A clear peak may be seen associated with the heat release.

Figure 4C:
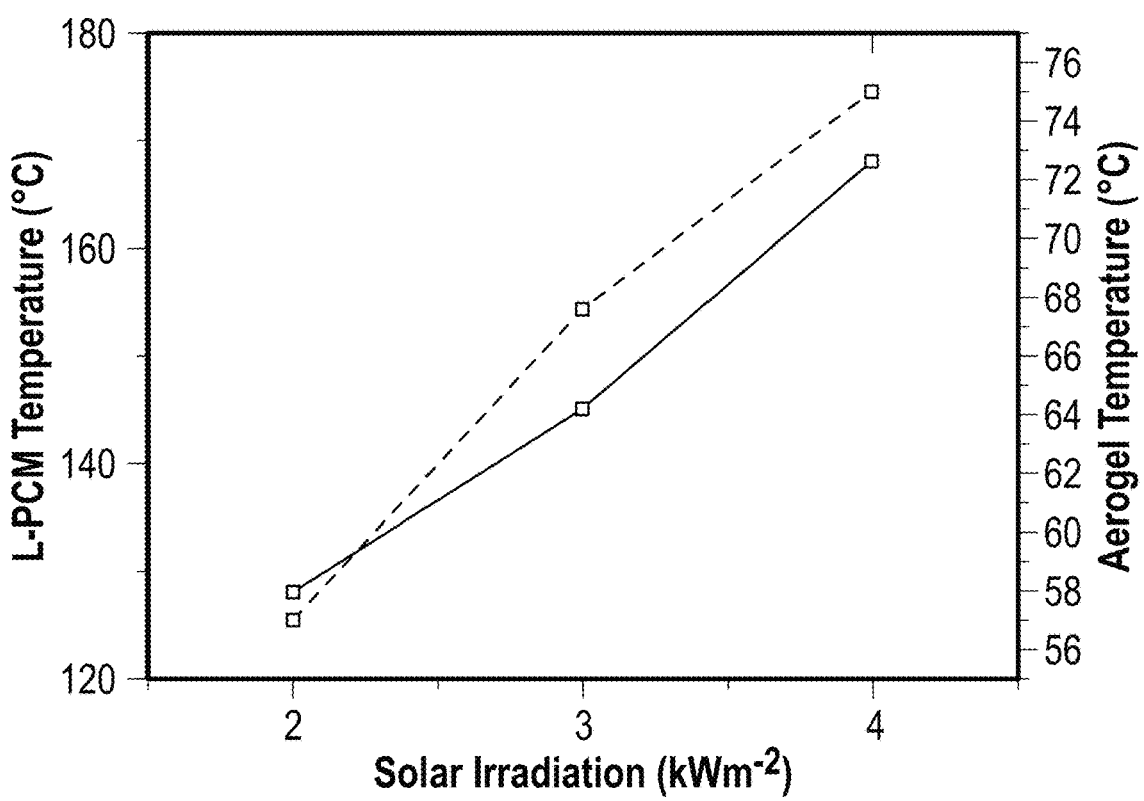
Figure 4D:
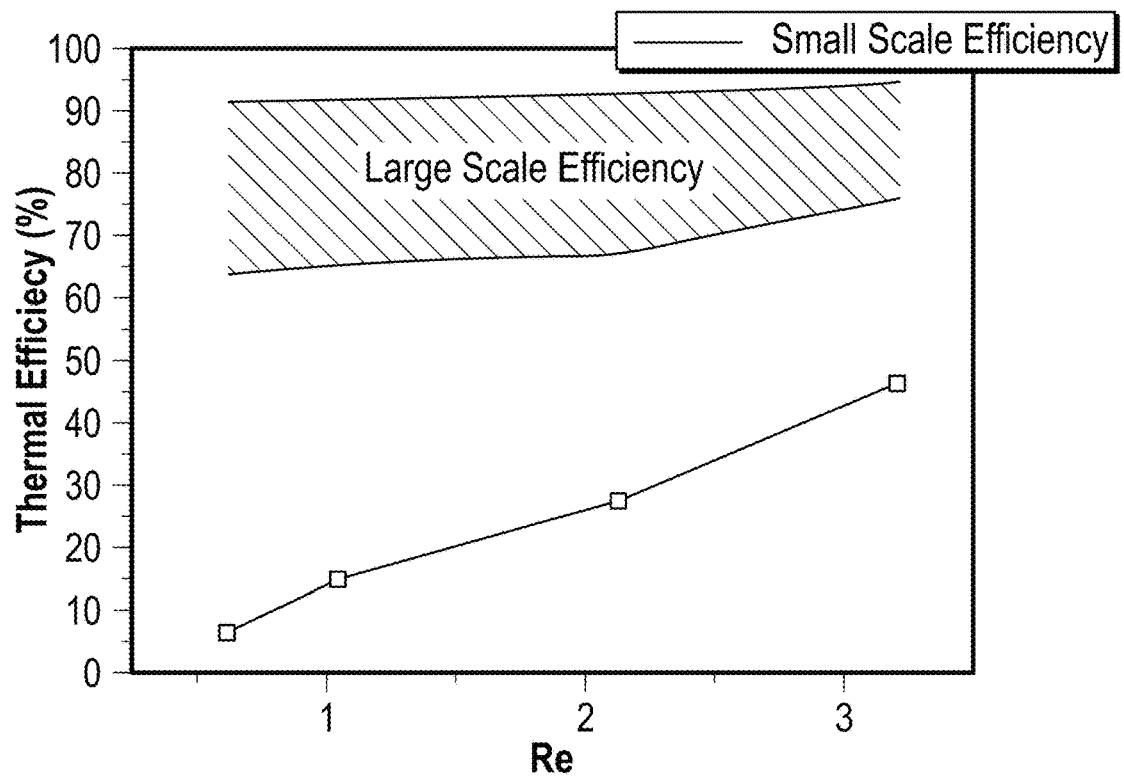

FIG. 4C illustrates the steady state temperature of the L-PCM and the temperature of the glass above the aerogel as a function of solar irradiation. In various aspects, the average temperature may be approximately 70° C. for an average L-PCM temperature of approximately 140° C. FIG. 4D illustrates exemplary small-scale and large-scale thermal efficiencies of energy harvested by the MSM which are plotted as a function of Reynolds number. A range of large-scale efficiencies are shown based on the thickness of the insulating layer used to cover the top surface. This large-scale efficiency may reach as high as approximately 94%.

Figure 13:
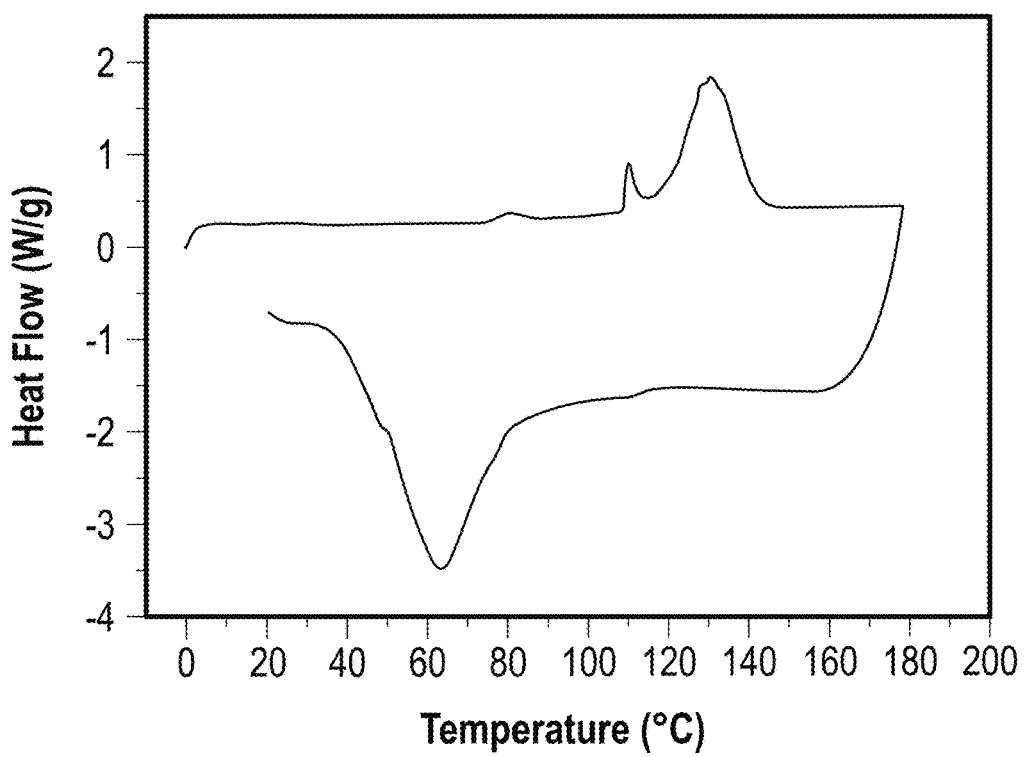
FIG. 13 is a diagram that illustrates a differential scanning calorimetry heat flow for the Phase Change Material, in accordance with the present disclosure.

In order for NBD to completely undergo photoisomerization to QC, the temperature of the MSM may be maintained at a temperature below the threshold temperature. For example, FIG. 4C shows that the average temperature on top of the aerogel glass is approximately 70° C., for an average L-PCM temperature of approximately 145° C. (which is above the phase change temperature of the L-PCM). Therefore, the molecular and phase change hybrid apparatus 100 may be operated up to a solar irradiation of 4 kWm$^{-2}$ while maintaining an MSM temperature below the threshold temperature for thermal back isomerization. The thermal efficiency of the MSM as a function of Reynolds number (see FIG. 4D). The thermal efficiency of the MSM may be given by $$\eta_{thermal} = \frac{\dot{m}C_p \int_0^t (T_{out} - T_{out}(L-PCM))dt}{\Delta E_{storage\ MSM}}$$

Where $\Delta E_{storageMSM}$ is the total energy that is stored by the MSM by molecular energy storage and sensible heat in joules. The term $\int_0^t$Tout–Tout(L-PCM))dt may be obtained from FIG. 4B for different Reynolds numbers. An efficiency of approximately 47% may be obtained for the MSM at a high flow rate (Re=3.21) while achieving a $T_{out}$ of approximately 119° C. The 2D side losses associated with a small-scale experiment may be simulated, as shown in FIG. 13. In various aspects, these losses may be avoided for large scale experiments, thereby increasing the efficiencies further up to approximately 76%. This efficiency can be further increased as a function of the thickness of the insulating layer used on the top surface, for nighttime operation. Large-scale and small-scale thermal efficiencies of the MSM, as a function of Reynolds number (see FIG. 4D).

With reference to FIGS. 5A-D, the performance of the molecular and phase change molecular and phase change hybrid apparatus 100 for both daytime and nighttime operations is shown in accordance with the present disclosure. The thermal efficiency of the aerogel monolith on top of the L-PCM may be obtained from a Rosseland diffusion approximation. Based on this approximation, the temperature field may be determined, and the corresponding aerogel thermal efficiency may be calculated (see FIG. 5A). The thickness of the aerogel monolith may be calculated based on optimal aerogel efficiency.

Figure 5A:
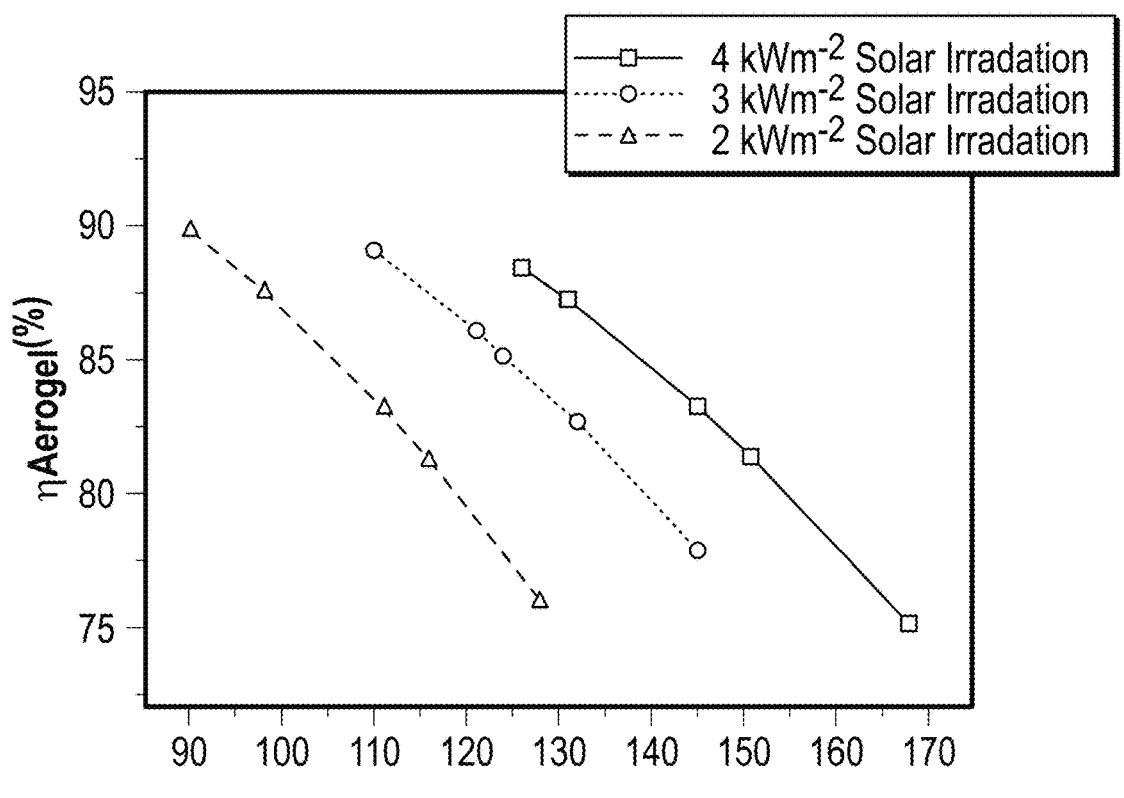
FIGS. 5A-D are diagrams that illustrate the performance of the molecular and phase change hybrid system, in accordance with the present disclosure.

FIG. 5A illustrates aerogel efficiency as a function of L-PCM surface temperature. In various embodiments, at low L-PCM surface temperatures, aerogel efficiency may be approximately 90% at low solar concentrations.

Figure 5B:
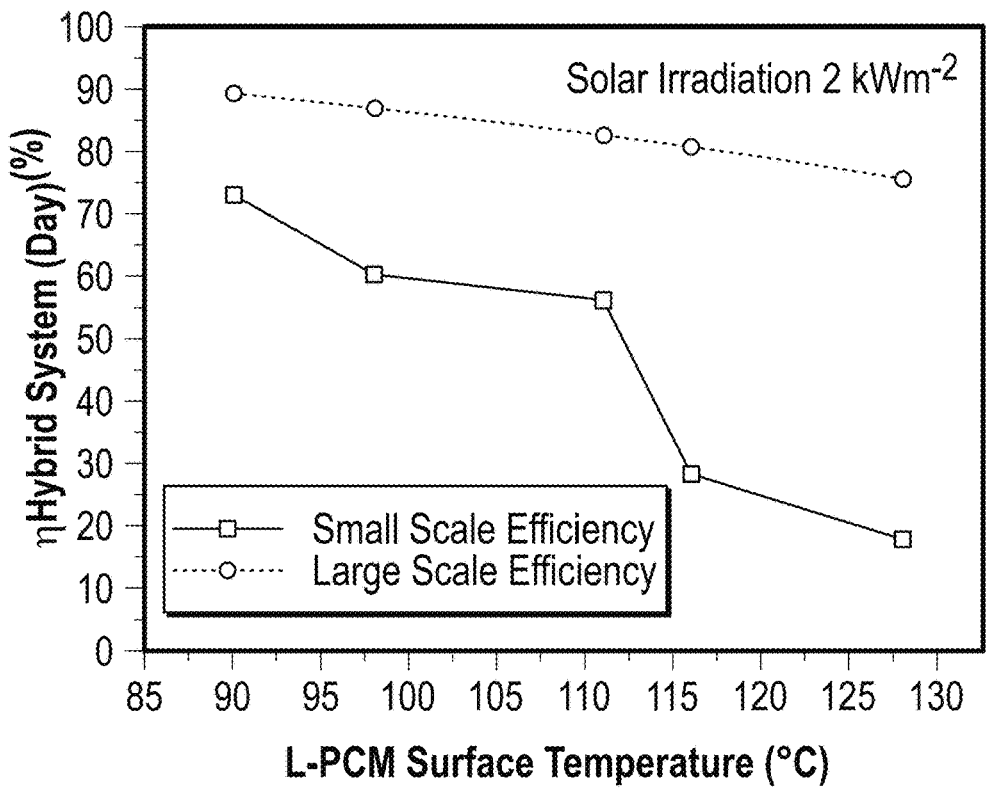

With reference to FIG. 5B, small-scale efficiency for daytime operation of the exemplary molecular and phase change hybrid apparatus 100 for sun solar irradiation is shown. The efficiency of the molecular and phase change hybrid apparatus 100 for daytime energy harvesting as a function of L-PPCM surface temperature for small-scale and large-scale operation is shown in accordance with the present disclosure. Based on the aerogel efficiency from FIG. 5A, the surface losses, and 2D losses may be calculated. For large-scale operation, the 2D losses may be negligible, and the system efficiency may be increased up to 90%, as shown in FIG. 5B.

Figure 5C:
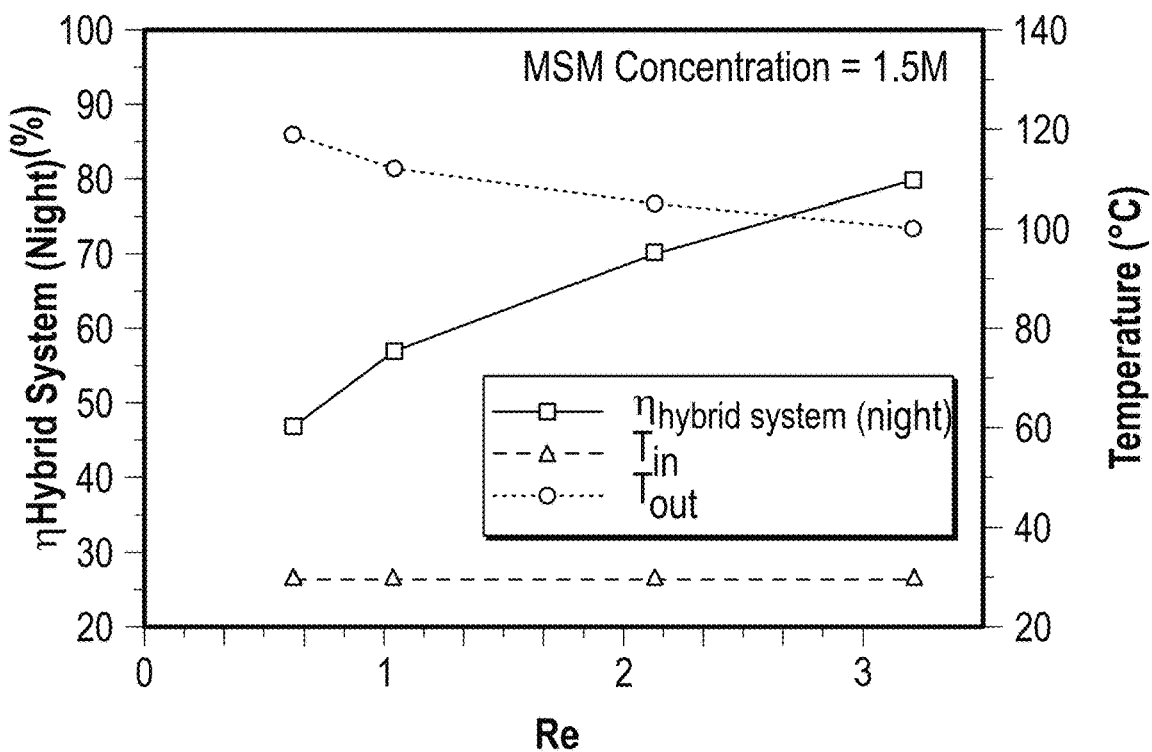

With reference to FIG. 5C, the nighttime efficiency of the molecular and phase change hybrid apparatus 100, and the final output temperature of the HTF as a function of Reynolds number is shown in accordance with the present disclosure. The system may exhibit a nighttime efficiency of approximately 80% while providing HTF at an output temperature of approximately 199° C.

Figure 5D:
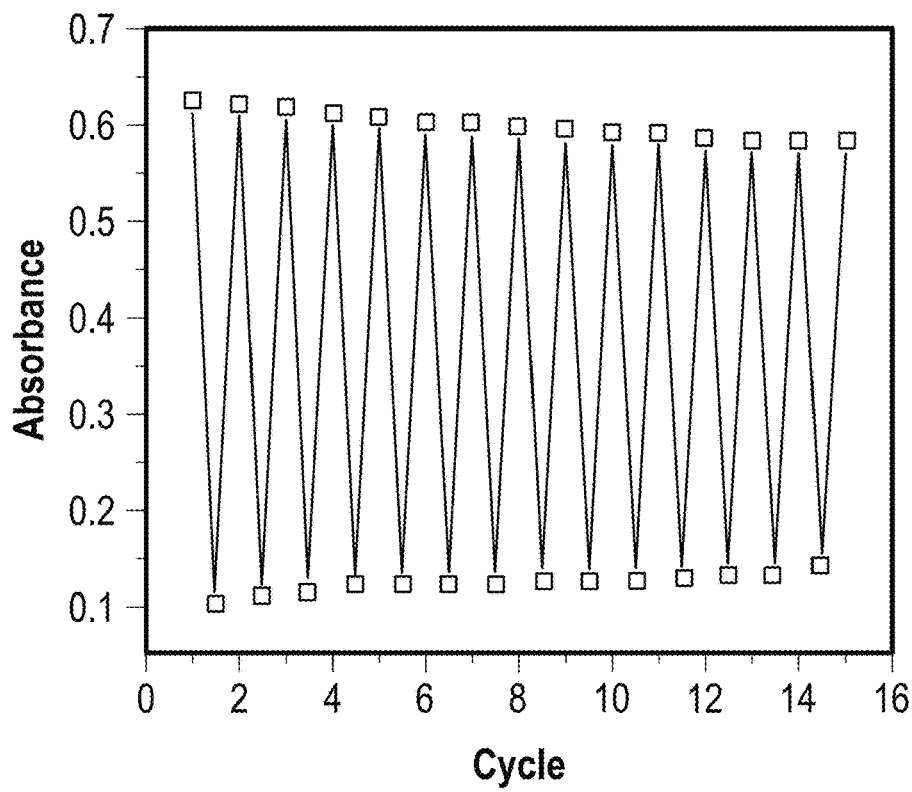

FIG. 5D illustrates the cyclic performance of the MSM is evaluated in isomerization and thermal back isomerization reaction for 35 cycles. In various aspects of the present disclosure, the degradation of MSM over these cycles was negligible.

Nighttime efficiency of the molecular and phase change hybrid apparatus 100 may be given by $$\eta_{hybrid\ system\ (night)} = \frac{\dot{m}C_P \int_0^t (T_{out} - T_{in})dt}{\Delta E_{storage\ L\text{-}PCM} + \Delta E_{storage\ MSM} + \Delta E_{storage\ SM}}$$

Where $\Delta E_{storage}$ L-PCM is the total energy stored by the L-PCM, including latent heat and sensible heat, in joules $\Delta E_{storage\ MSM}$ is the total energy stored by the MSM by molecular energy storage and sensible heat in joules, and $\Delta E_{storage\ SM}$ represents the component of the input heat that may be stored in the surrounding media as sensible heat in joules. The term $\int_0^t (T_{out} - T_{in})dt$ may be obtained from FIG. 17 for different Reynolds numbers.

Figure 6:
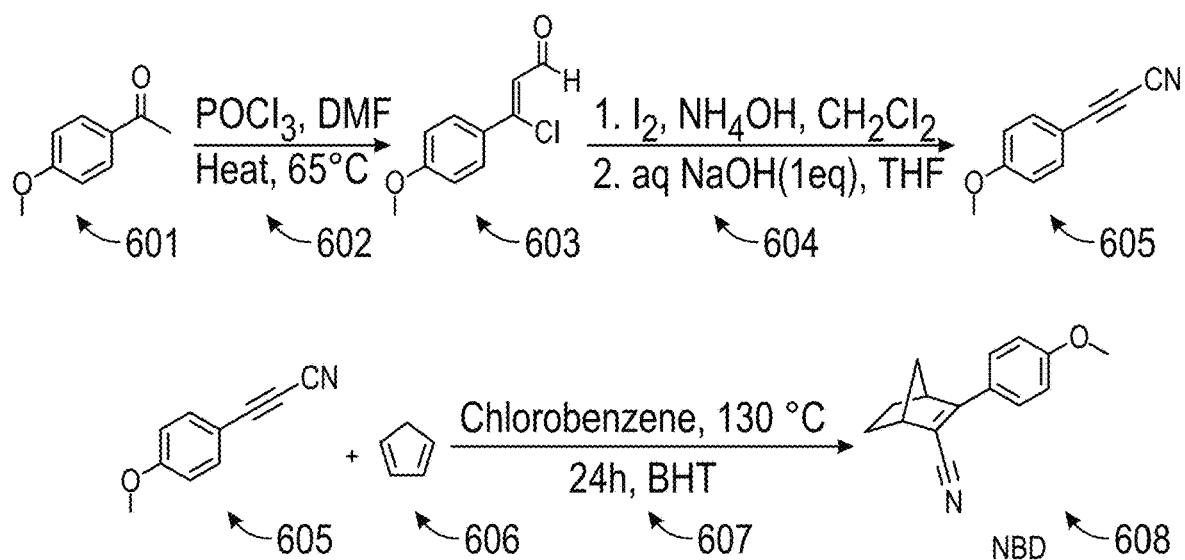
FIG. 6 is a diagram that illustrates a scheme for the synthesis of Molecular Storage Material, in accordance with the present disclosure.

FIG. 6 illustrates the preparation of Molecular Storage Material (MSM), specifically the synthesis of NBD absorbates 608. A flame dried round bottom flask with about 120 ml of DMF solution may be cooled to 0° C. followed by the dropwise addition of about 50 ml solution of POCl$_3$ 601. The solution mixture may be warmed to room temperature for about 30 minutes and again cooled to 0° C. The mixture may then be added with 4-methoxyacetophenone (about 20.00 g, 0.133 mol). The reaction may then be heated to about 65° C. for about 5 hours (602), and then cooled to room temperature. The reaction mixture may be quenched with an aqueous saturated NaHCO$_3$ solution. Quenching can be continued until the bubble gas no longer appears. The residue may be extracted with CH$_2$Cl$_2$ and washed with water and brine. The organic phase may then be evaporated and dried over with MgSO$_4$ to obtain the yellow solid product (~65% yield). H-NMR (400 MHz, CDCl3): δ 10.192 (d, J=6.8 Hz, 1H, CHO), 7.74 (d, J=8.8 Hz, 2H, Ar), 6.96 (d, J=8.8 Hz, 2H, Ar), 6.62 (d, J=7.2 Hz, 2H, ClC=CH), 3.869 (s, 3H, OCH$_3$).

3-(4-methoxyphenyl)propiolonitrile may be synthesized in accordance with the present disclosure. Iodine (6.50 g, 0.0256 mol) may be added into the stirring solution of (Z)-3-chloro-3-(4-methoxyphenyl)acrylaldehyde (5.00 g, 0.0254 mol) in 200 ml of CH$_2$Cl$_2$ solution mixture followed by the addition of 50 ml of 30% aqueous ammonium hydroxide solution. The reaction mixture may be stirred vigorously overnight or until the dark color from the iodine exhibits an almost colorless color. The neutralization of iodine may be achieved with the addition of aqueous sodium thiosulphate. The organic layer may then be separated and evaporated under reduced pressure. All of the solid may be dissolved with the THF solution, followed by an addition of aqueous NaOH solution 604. The mixture may continue to be stirred overnight, and then all the organic solution may be evaporated. The aqueous layer may be extracted with CH$_2$Cl and washed with water and brine. The solution may be dried with MgSO$_4$. The organic phase may be evaporated under a vacuum to obtain the solid (~73% yield). The recrystallization process may include the use of ethyl acetate or petroleum ether. H-NMR (400 Mhz, CDCl3): δ 7.55 (d, J=7.8 Hz, 2H, Ar), 6.89 (d, J=9.0 Hz, 2H, Ar), 3.482 (s, 2H, Ar).

1, 4-Butadiene may be synthesized as follows: The experiment may include using a distillation reaction. For example, the dicyclobutadiene may be added into a 100 ml round bottom flask. The iron fillings may then be added to the solution. The reaction may be heated until it reaches 170° C. Upon collecting the 1,4-butadiene, the cooling temperature may be −10° C. due to the conversion of 1,4-butadiene to dicyclobutadiene at room temperature. The product may be obtained in the colorless liquid.

(1S,4R)-3-(4-methoxyphenyl)bicyclo[2.2.1]hepta-2,5-diene-2-carbonitrile may be synthesized as follows: The reaction may be performed using a microwave reaction. The 3-(4-methoxyphenyl) propiolonitrile (2.00 g, 0.0127 mol) may be dissolved in chlorobenzene (20 ml) solution followed by addition of 1,4-butadiene (2.52 g, 0.0381 mol) and BHT (5 mg, catalyzed) in a microwave vial. The vial may be sealed and heated to 130° C. for 24 hours 607. The mixture may be loaded into the silica gel column chromatography with CH$_2$Cl$_2$/petroleum ether (about 1:1) then to about (1:3). The purified product may be obtained in a slightly yellow solid (~60% yield). H-NMR (400 Mhz, CDCl3): δ 7.723 (d, J=8.4 Hz, 2H, Ar), 6.95 (d, J=8.4 Hz, 2H, Ar), 6.92 (ddd, J=5.1, 3.0, 0.7 Hz, 1H, CH), 3.901 (ddtd, J=3.0, 2.5, 1.6, 0.8 Hz, 1H, CH), 3.84 (s, 3H), 2.25 (dt, J=6.8, 1.6 Hz, 1H, CH), 2.16 (dt, 1H, CH) ppm.

Figure 7:
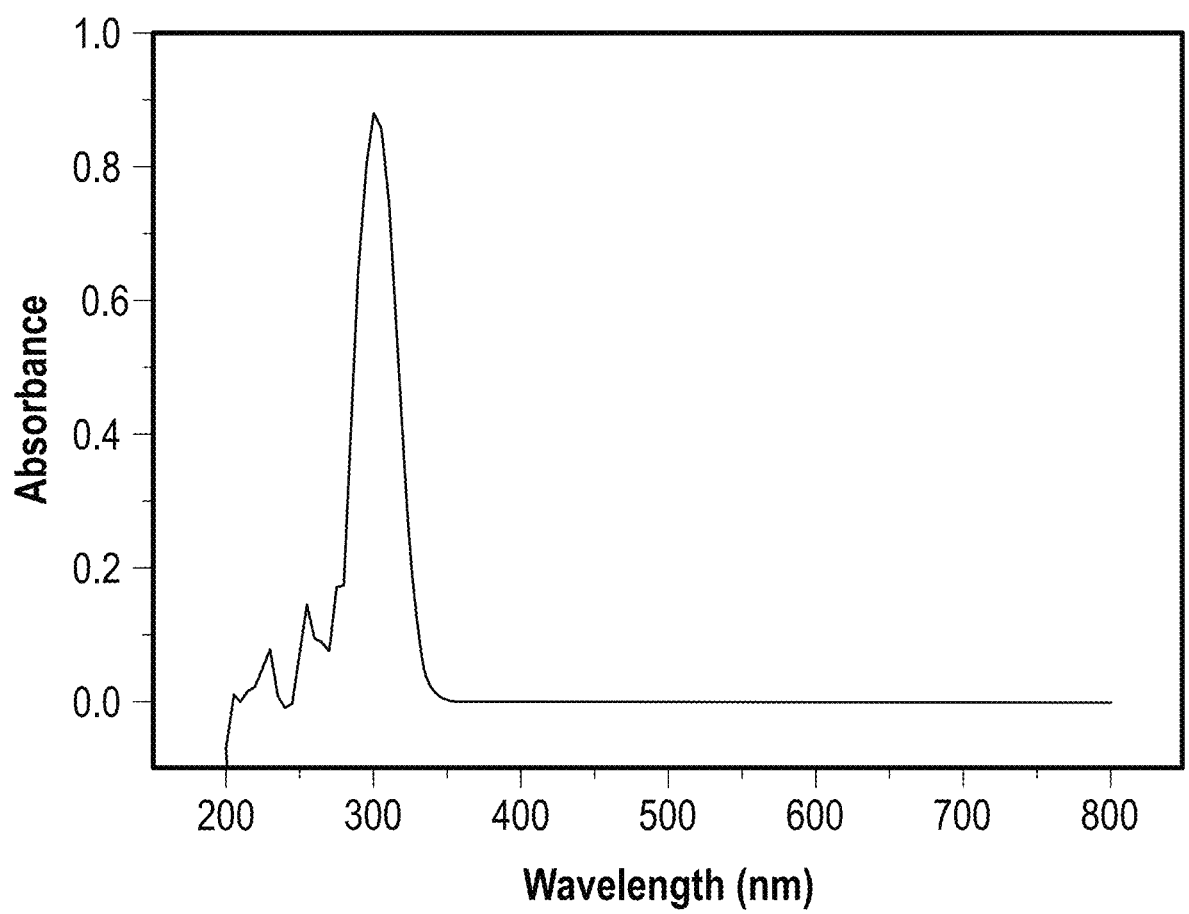
FIG. 7 is a diagram that illustrates Ultraviolet-Visible absorption of Phase Change Material, in accordance with the present disclosure.

With reference to FIG. 7, a diagram that illustrates the Ultraviolet-visible spectroscopy ("UV-vis") absorption spectrum for the PCM (i.e., KNO$_3$+NaNO$_3$+LiNO$_3$), between 200 nm and 800 nm wavelengths, is shown. Carbonized Rayon, which may be introduced within the PCM, absorbs the incoming solar irradiation, converts to heat and supplies this heat to the PCM to initiate the phase change. Although, an absorption peak is seen for PCM in the UV range of the solar spectrum (l=300 nm), as shown in FIG. 7, the use of the MSM may be used in harvesting UV radiation. The MSM releases absorbed energy during the back-isomerization process at night and provides significantly higher output temperatures ($T_{out}$) without compromising the efficiency of the system.

With reference to FIGS. 8A and 8B, an exemplary molecular and phase change molecular and phase change hybrid apparatus 800, is shown. In one aspect of the present disclosure, the molecular and phase change molecular and phase change hybrid apparatus 800 may be placed in an aerogel insulation box 802 to minimize 2D losses for small scale operation. For evaluation of the performance of the molecular and phase change molecular and phase change hybrid apparatus 800, a solar simulator may be used, including an optical head, a power measurement system consisting of a thermopile detector, and a power meter. K-type thermocouples 804 may be used to measure temperatures at various points within the molecular and phase change molecular and phase change hybrid apparatus 800, which may be connected to a data acquisition system. In one aspect of the present disclosure, the external chamber may be fabricated with acrylic, and the internal system may be fabricated with borosilicate glass. The diameter of the chambers holding the L-PCM and MSM may be, for example, 5 cm each and the chamber holding the silica aerogel monolith may be, for example, 6.5 cm in diameter. The bottom chamber containing the L-PCM may have stainless steel tubing passing through it to carry the heat transfer fluid, whereas the MSM chamber may be equipped with 1.5 mm square cross-section glass tubing to carry the HTF for maximum transmission to the bottom layer. The top MSM chamber may be covered with an anti-reflective glass having about >94% transmittance in the solar spectrum. The HTF may be flowed into the system using a syringe pump. The entire system may be placed in an insulation box made with acrylic to minimize 2D losses. The present disclosure is not limited to the equipment herein described. It is contemplated that, and the systems and methods of the present disclosure may function and operate using different equipment.

Figure 9:
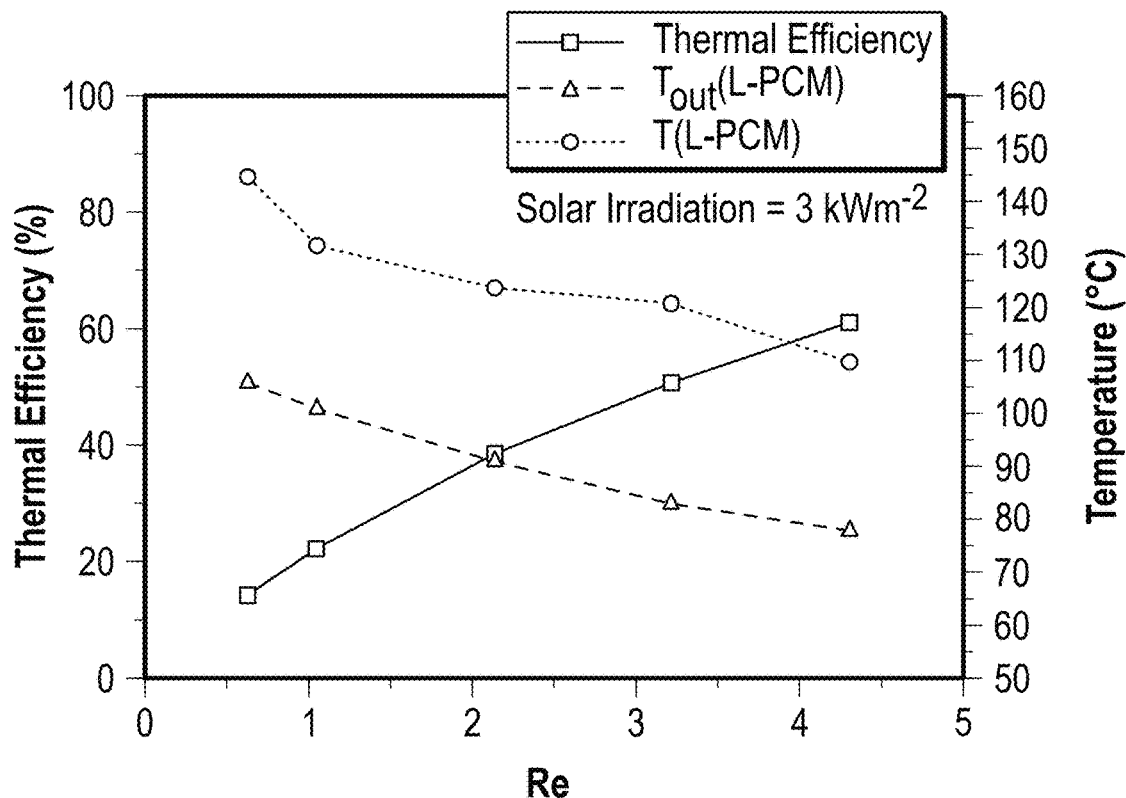
FIG. 9 is a diagram that illustrates thermal efficiency as a function of Reynolds number for 3 KWm$^{-2}$, in accordance with the present disclosure.

FIG. 9 illustrates thermal efficiency as a function of Reynolds number for 3 KWm$^{-2}$ solar irradiation.

Figure 10:
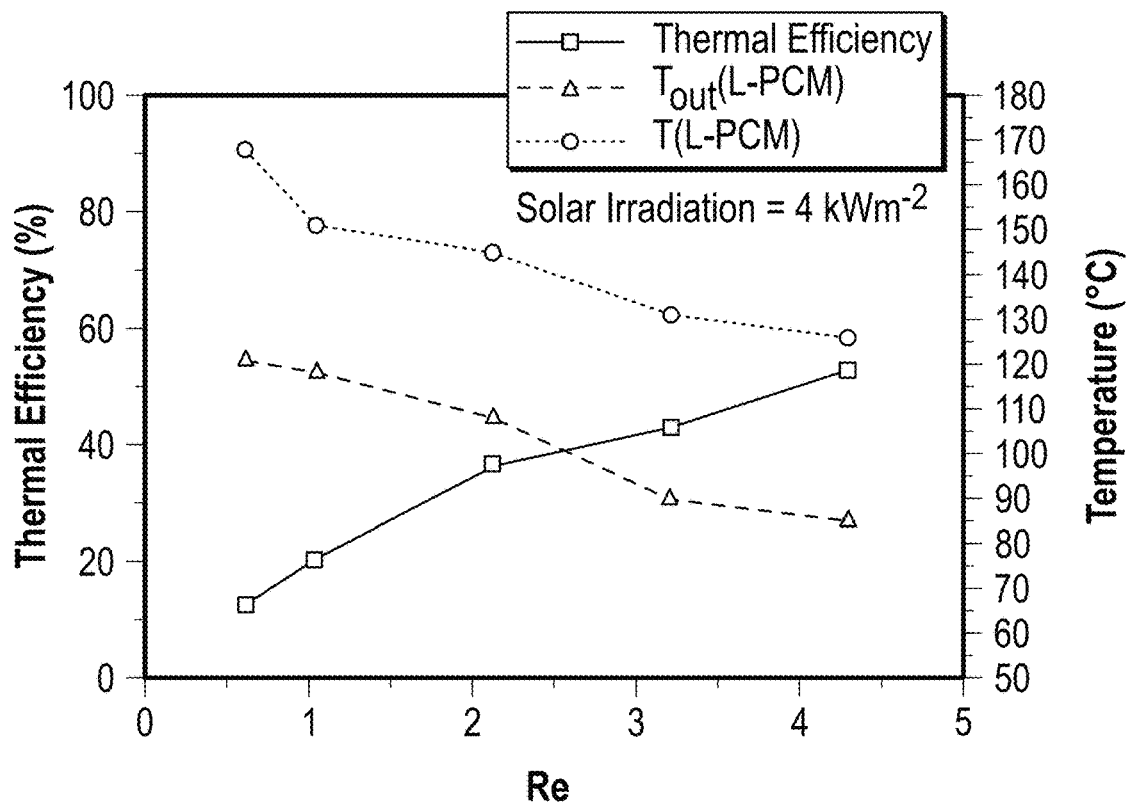
FIG. 10 is a diagram that illustrates thermal efficiency as a function of Reynolds number for 4 KWm$^{-2}$, in accordance with the present disclosure.

FIG. 10 illustrates thermal efficiency as a function of Reynolds number for 4 KWm$^{-2}$.

FIG. 11 illustrates a diagram that illustrates an exemplary NMR spectrum to confirm the conversion of NBD to QC before DSC. In various aspects, the volatile toluene solution may be evaporated, and complete conversion to QC may be confirmed by NMR prior to conducting the DSC.

Figure 12:
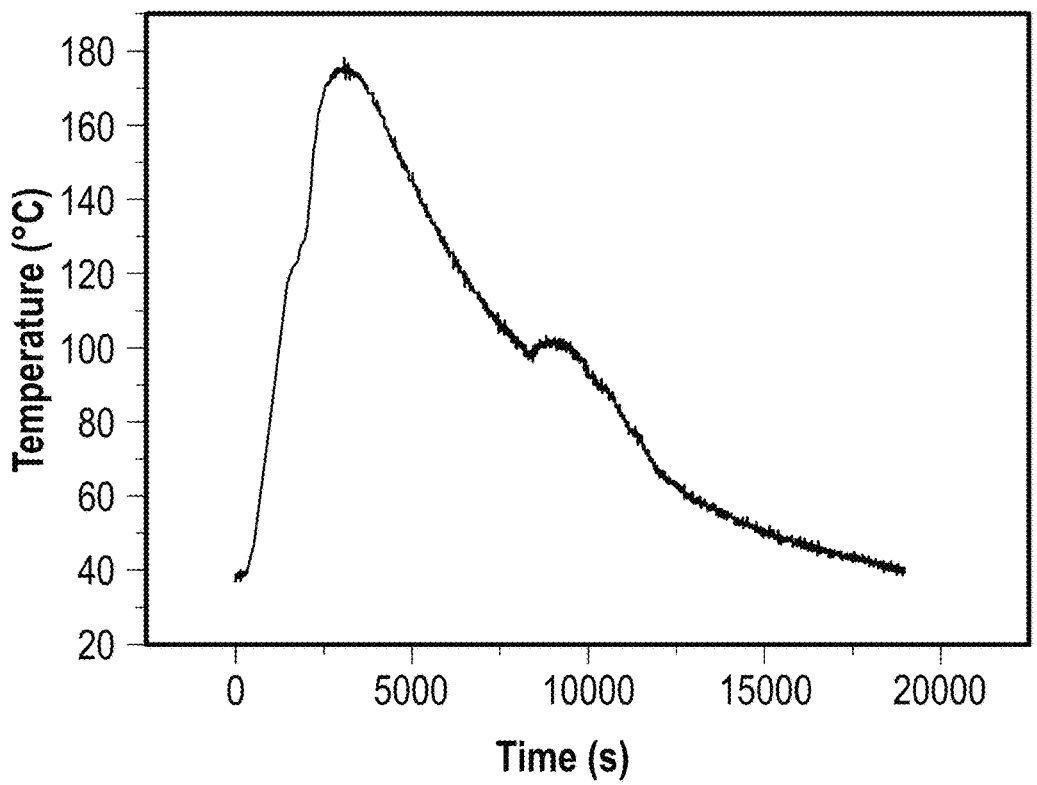
FIG. 12 is a diagram that illustrates temperature as a function of time for heating and cooling curves of the Phase Change Material, in accordance with the present disclosure.

FIG. 12 illustrates an exemplary phase change diagram that illustrates temperature as a function of time for the heating and cooling curves of the PCM.

FIG. 13 is a diagram that illustrates a DSC heat flow for the PCM between 20 and 180° C. In one aspect of the present disclosure, the PCM may consist of, for example, 52% KNO$_3$, 20.6% NaNO$_3$, and 25.9% LiNO$_3$.

Figures 14, 15:
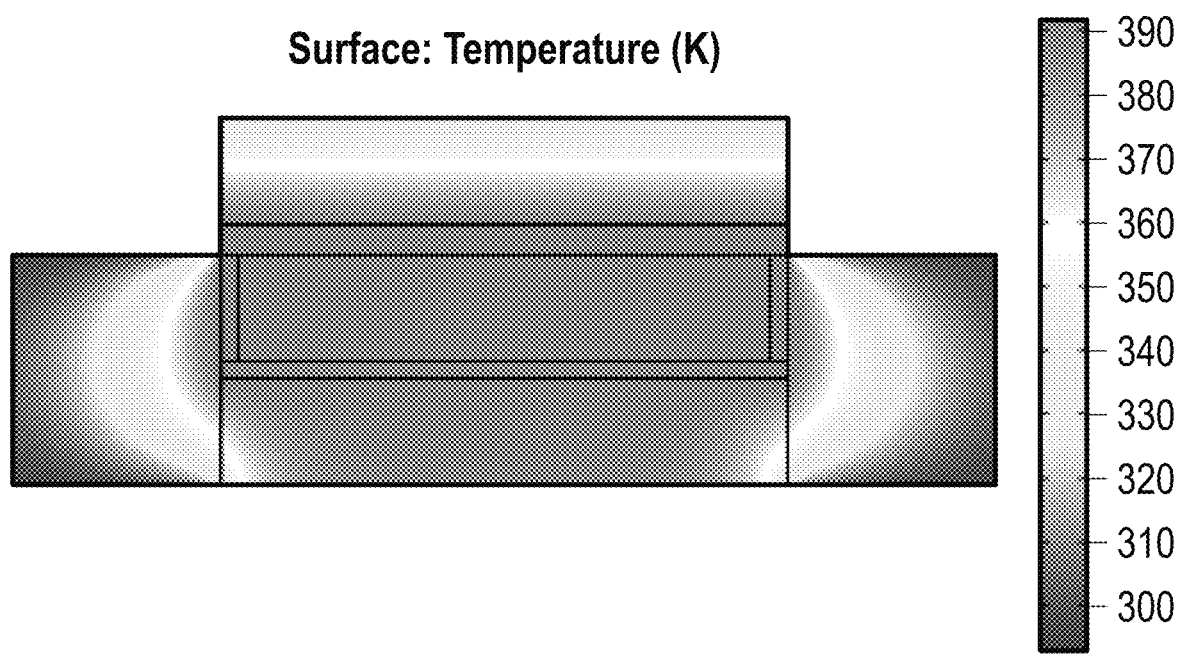
FIG. 14 is a table that illustrates 2D losses for the thermal efficiency of Molecular Storage Material, in accordance with the present disclosure.
FIG. 15 is a diagram of a simulation that illustrates a temperature field for the Molecular Storage Material layer of the molecular and phase change molecular and phase change hybrid apparatus 100 for night operation, in accordance with the present disclosure.

FIG. 14 is a table that illustrates exemplary 2D thermal efficiency losses for MSM.

FIG. 15 is a diagram of a simulation that illustrates the temperature field for the MSM layer of the molecular and phase change hybrid apparatus for night operation. The exemplary simulation may be conducted to evaluate the 2D losses due to the top MSM layer during the night operation. An additional fiberglass layer may be added on the top to minimize the surface losses, as shown in the above figure. The boundary conditions may include a boundary condition with h=10 Wm$^{-2}$K$^{-1}$ at the external side boundaries and on the top surface. An insulated boundary condition may be applied to the bottom boundary. The MSM placed in a glass setup may be surrounded by Silica aerogel particles. Silica aerogel monolith may be placed at the bottom, and an anti-reflective glass may cover the top. The surface losses may vary as a function of the thickness of fiberglass insulation used on the top. As exemplified by FIG. 15, there may be associated surface losses dependent on the thickness of insulation.

Figure 16:
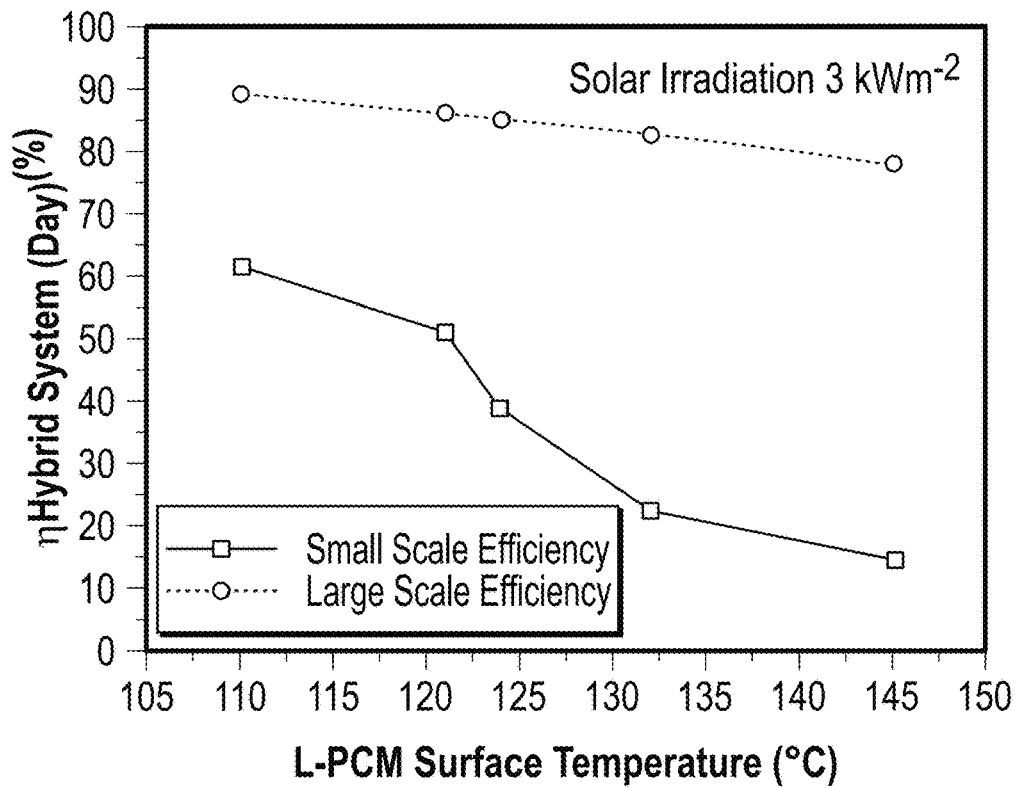
FIG. 16 is a diagram that illustrates molecular and phase change hybrid apparatus 100 efficiency for daytime operation for 3 KW$^{-2}$ solar irradiation as a function of L-PCM temperature, in accordance with the present disclosure.

With reference to FIG. 16, an exemplary diagram that illustrates molecular and phase change hybrid apparatus 100 efficiency for daytime operation for 3 KW$^{-2}$ solar irradiation as a function of L-PCM temperature is shown in accordance with the present disclosure.

Figure 17:
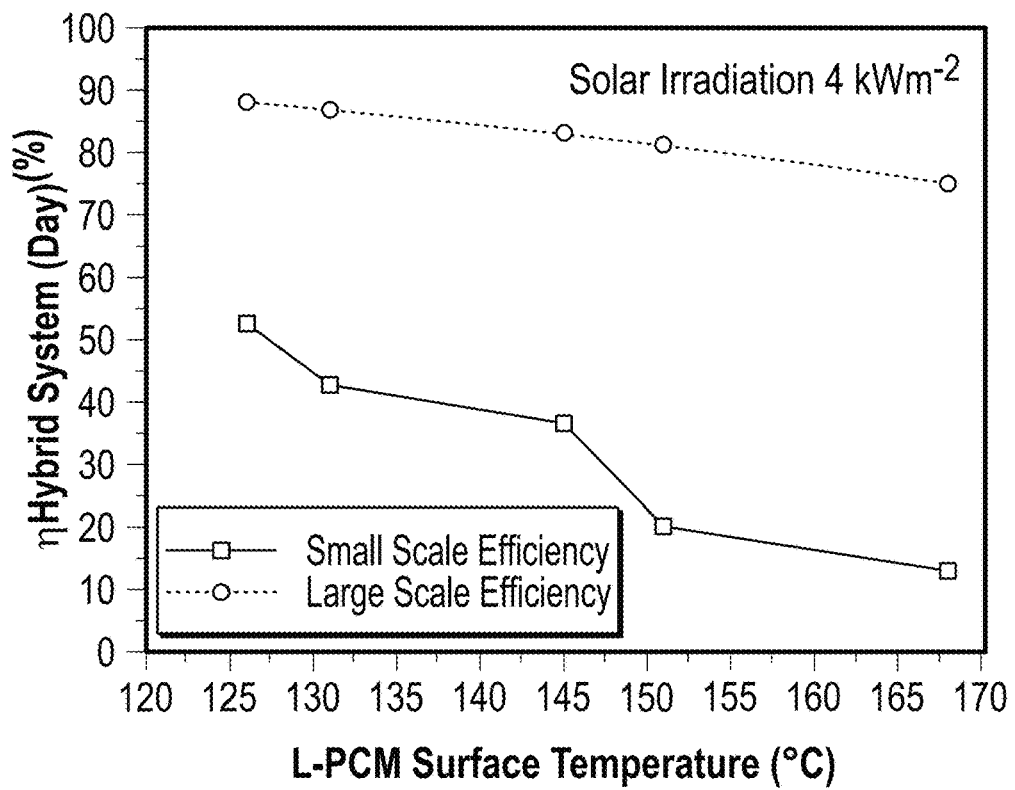
FIG. 17 is a diagram that illustrates molecular and phase change hybrid apparatus 100 efficiency for daytime operation for 4 KWm$^{-2}$ solar irradiation as a function of L-PCM temperature, in accordance with the present disclosure.

With reference to FIG. 17, a diagram that illustrates molecular and phase change hybrid apparatus 100 efficiency for daytime operation for 4 KWm$^{-2}$ solar irradiation as a function of L-PCM temperature is shown in accordance with the present disclosure.

Figures 18, 19:
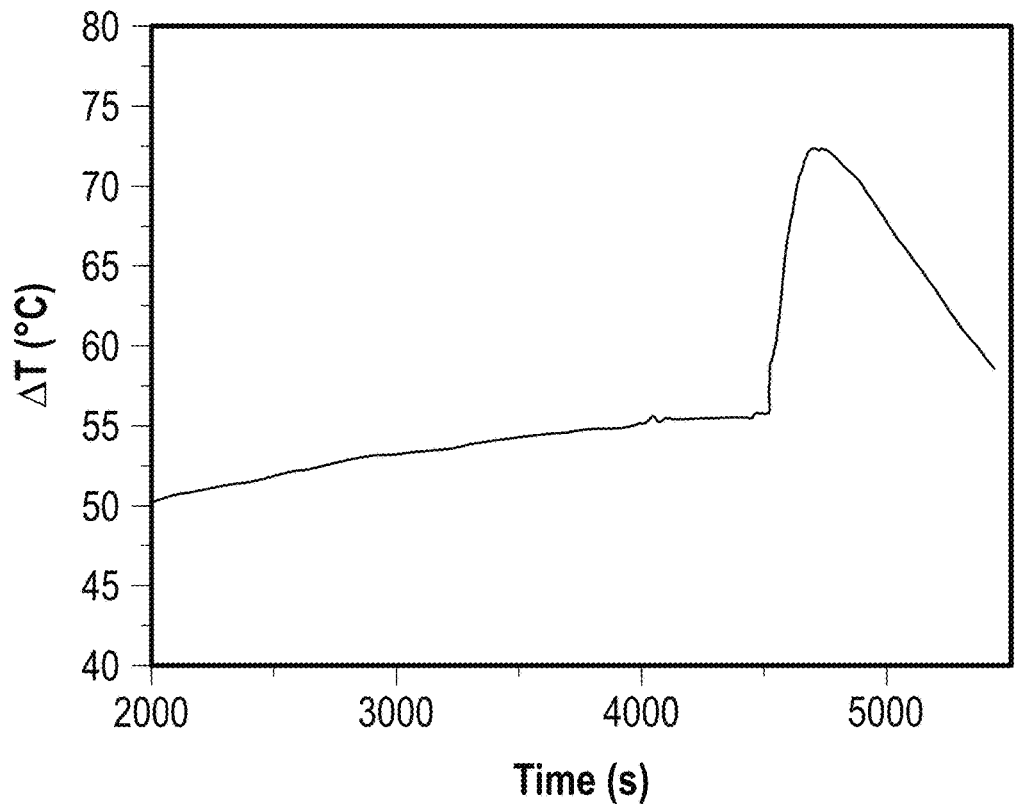
FIG. 18 is a diagram that illustrates temperature difference for HTF between $T_{in}$ and $T_{out}$, in accordance with the present disclosure.
FIG. 19 is a table that illustrates surface losses for the molecular and phase change molecular and phase change hybrid apparatus 100 for night operation, in accordance with the present disclosure.

With reference to FIG. 18, a diagram that illustrates the temperature difference for HTF between T$_{in}$ and T$_{out}$, is shown in accordance with the present disclosure. In the exemplary diagram, the peak may correspond to the energy released by MSM, and the curve may be used in the efficiency calculations for nighttime efficiency of the hybrid system.

With reference to FIG. 19, a table that illustrates surface losses for the molecular and phase change molecular and phase change hybrid apparatus 100 for night operation is shown in accordance with the present disclosure. The molecular and phase change hybrid apparatus 100 may offer approximately 80% efficiency while delivering the heat transfer fluid at an output temperature of approximately 119° C. during nighttime operation. This opens up a wide array of applications where the solar energy may be stored during the day and harvested during night at high temperature, including but not limited to water heating, power generation, and sterilization. Cyclic experiments may be conducted to evaluate the stability of MSM over several operating cycles. NBD may be converted to QC under UV illumination and complete conversion may be verified with a UV-vis spectrometer. Thermal back isomerization may be initiated on a heating stage at 85° C. and complete back conversion may be again confirmed with a UV-vis spectrometer. This process may be carried out for 35 cycles and a negligible degradation may be seen, in accordance with FIG. 5D.

The energy balance for the system and the energies stored by both the L-PCM and MSM are described in the present disclosure. The following calculations may be used to determine the efficiency and heat loss of the exemplary molecular and phase change molecular and phase change hybrid apparatus 100 during night operation. The energy balance for the overall storage process may be written as Energy input-[Energy recovered + Energy loss] = Energy accumulation For the discharging cycle, the energy balance can be reduced to -[Energy recovered + Energy loss] = Energy accumulation Therefore, the discharge/recovery efficiency may be written as follows:

$$\eta_{recovery} = \frac{\dot{m}C_p \int_0^t (T_{out} - T_{in})dt}{\Delta E_{storage\ L\text{-}PCM} + \Delta E_{strage\ MSM} + \Delta E_{storage\ SM}}$$

Where $\Delta E_{storage\ L\text{-}PCM}$ is the total energy stored by the L-PCM, including latent heat and sensible heat in joules, $\Delta E_{storage\ MSM}$ is the total energy stored by the MSM including the molecular energy storage and sensible heat in joules. A component of the input heat flux may be stored in the surrounding media, including glass and the aerogel in the form of sensible heat. $\Delta E_{storage\ SM}$ represents the component of the input heat that may be stored in the surrounding media as sensible heat in joules. Therefore, the total energy stored by the molecular and phase change hybrid apparatus 100 may be given by $$\Delta E_{storage\ L\text{-}PCM} + \Delta E_{storage\ MSM} =$$
$$(C_{pl}\Delta T + E_{pcm} + C_{ps}\Delta T)m_{pcm} + (E_{MSM} - C_pm\Delta T)m_{MSM}$$

Where $C_{pl}$ is the specific heat of the PCM in the liquid phase in $Jg^{-1}K^{-1}$, $E_{pcm}$ is the enthalpy of phase change in $Jg^{-1}$, $E_{MSM}$ is the energy stored in MSM in $Jg^{-1}$, $C_{pm}$ is the specific heat of MSM in $Jg^{-1}K^{-1}$, $C_{ps}$ is the specific heat of the PCM in solid phase in $Jg^{-1}K^{-1}$, and $m_{pcm}$ is the mass of PCM used.

$$\Delta E_{storage\ SM} = (C_{pg}\Delta T)m_{glass} + (C_{pa}\Delta T)m_{aerogel}$$

Where $C_{pg}$ is the specific heat of glass in $Jg^{-1}K^{-1}$, $m_{glass}$ is the mass of glass for the device, $C_{pa}$ is the specific heat of the surrounding insulating aerogel in $Jg^{-1}K^{-1}$ and $m_{aergogel}$ is the mass of the surrounding insulating aerogel. A surface temperature of approximately 70° C. may be measured for the surrounding glass and 60° C. may be measured for the surrounding insulating gel.

Figure 20:
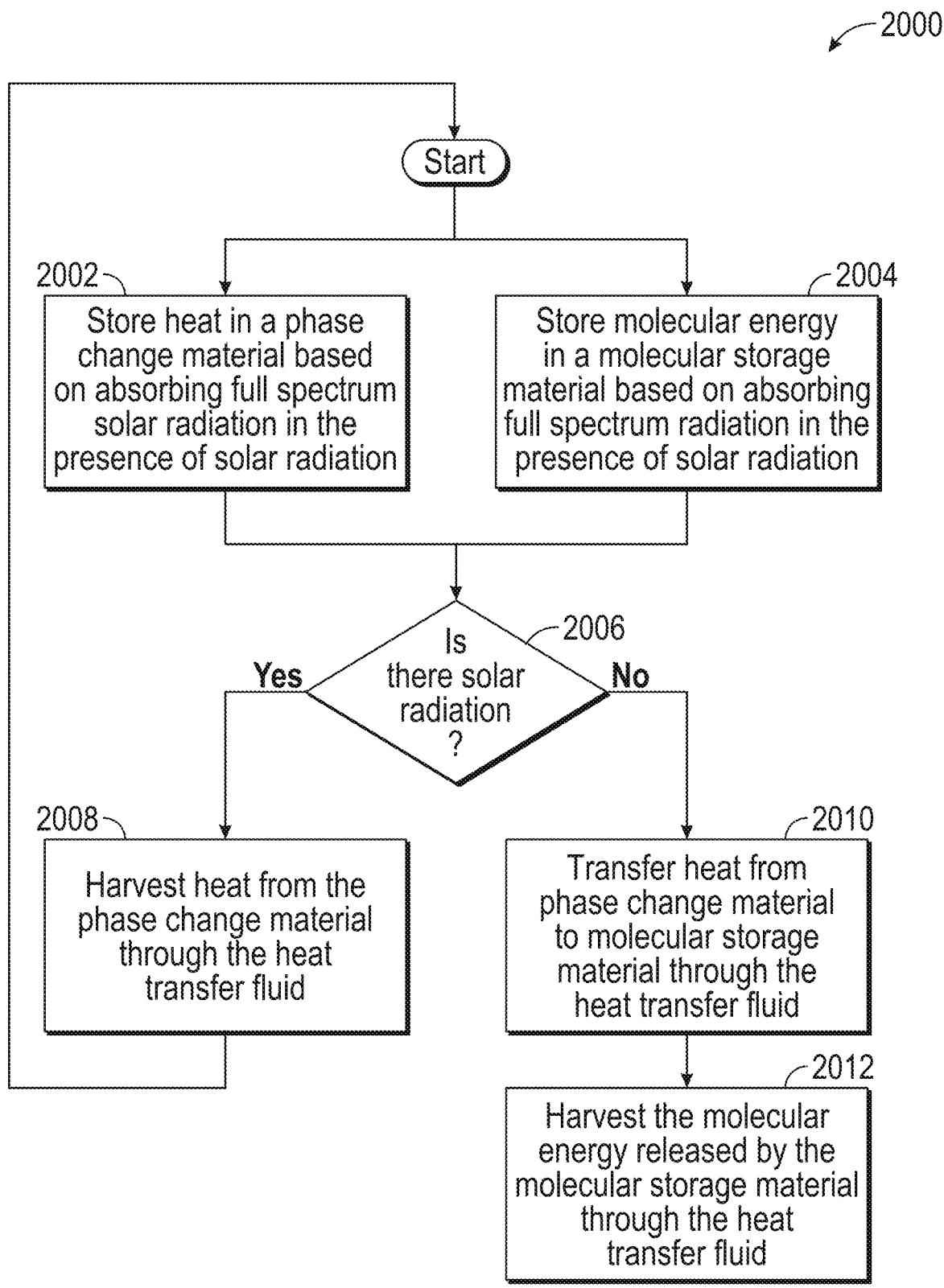
FIG. 20 is a flowchart that illustrates a method for full spectrum solar thermal energy harvesting and storage by molecular and phase change material hybrids, in accordance with the present disclosure.

The flowchart of FIG. 20 illustrates an exemplary method for full spectrum solar thermal energy harvesting and storage by molecular and phase change material hybrids in accordance with the present disclosure. In various aspects, the method of FIG. 20 can be performed by the system for full spectrum solar thermal energy harvesting and storage by molecular and phase change material hybrid apparatus provided in the present disclosure. The following description will refer to the system for full spectrum solar thermal energy harvesting and storage by molecular and phase change material hybrid apparatus provided in the present disclosure, but it will be understood that such description is exemplary and does not limit the scope and applicability of the present disclosure.

At step 2002, the method, in the presence of solar radiation, stores heat by a phase change material. In various aspects, a solid phase change material may be transformed into a liquid phase change material, wherein the liquid phase change material may store latent heat absorbed from full spectrum solar radiation. With reference to FIG. 1D, an exemplary diagram that illustrates the process by which solid-liquid and liquid-solid phase transformation is shown.

At step 2004, the method, in the presence of solar radiation, stores molecular energy in a molecular storage material, based on the molecular storage material absorbing full spectrum solar radiation. In various aspects of the disclosure, upon exposure to the solar radiation, the parent molecules of the molecular storage material may isomerize into molecules with a higher energy state than the parent molecules (see FIG. 1C). In various aspects, the molecular storage material may include NBD-QC.

At step 2006, the method, if there is solar radiation present, harvests heat from the phase change material. However, if there is no solar radiation present, then heat may be transferred from the phase change material to the molecular storage material.

At step 2008, the method, in the presence of solar radiation, harvests heat from the phase change material through a heat transfer fluid. Heat may be harvested from the phase change material upon transformation of a liquid phase change material into a solid phase change material (see FIG. 1D).

At step 2010, the method, in the absence of solar radiation, transfers heat from the phase change material to the molecular storage material. Heat transferred from the phase change material to the molecular storage material may isomerize the higher energy state molecule (QC) back into the parent molecule (NBD), thereby releasing molecular energy (see FIG. 1C).

At step 2012, the method harvests the molecular energy released by the molecular storage material, as a product of isomerization of the higher energy state molecules back into the parent molecules, through the heat transfer fluid.

The present disclosure includes a molecular and phase change hybrid apparatus 100 wherein the physics of molecular energy storage by photoisomerization and phase change energy storage by latent heat may be coupled to harvest thermal energy from the sun and may provide a 24/7 energy supply. The molecular and phase change hybrid apparatus 100 may absorb the complete solar spectrum and there may be minimal degradation of material even after 35 cycles of operation. Various embodiments may achieve a molecular and phase change hybrid apparatus 100 efficiency of approximately 73% for energy harvesting during the day, at 21 $kWm^{-2}$ solar irradiation, which can be increased to approximately 90% for large-scale operation and an efficiency of approximately 80% for energy harvesting during the night. This concept may be used for different combinations of PCM and MSM materials to achieve higher energy densities. Applications for the molecular and phase change hybrid apparatus 100 include but are not limited to desalination, power generation, and distillation.

Certain aspects of the present disclosure may include some, all, or none of the above advantages and/or one or more other advantages readily apparent to those skilled in the art from the figures, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached figures are presented only to demonstrate certain examples of the disclosure. Other elements, steps, methods, and techniques that are insubstantially different from those described above and/or in the appended claims are also intended to be within the scope of the disclosure.

What is claimed is:

1. An apparatus for solar thermal harvesting and collection, the apparatus comprises:
an enclosure, wherein the enclosure includes:
a bottom layer;
a middle layer disposed on the bottom layer;
a top layer disposed on the middle layer, wherein the top layer includes a molecular storage material configured to absorb full spectrum solar radiation; and
a tube that is configured to connect the bottom layer and the top layer.

2. The apparatus of claim 1, wherein the bottom layer includes a phase change material configured to absorb full spectrum solar radiation.

3. The apparatus of claim 1, wherein the middle layer contains an insulating material.

4. The apparatus of claim 1, wherein the tube is configured to transfer heat between the bottom layer and the top layer.

5. The apparatus of claim 4, wherein the tube is configured to allow a heat transfer fluid to flow therein.

6. The apparatus of claim 5, wherein the tube is configured to harvest heat out of the apparatus.

7. The apparatus of claim 2, wherein the phase change material includes a solid phase change material.

8. The apparatus of claim 7, wherein energy is released during a phase transition of the solid phase change material into a liquid phase change material.

9. The apparatus of claim 1, wherein the molecular storage material includes norbornadiene-quadricyclane.

10. A method for solar thermal harvesting and collection, the method comprising:
storing a first heat in a phase change material in the presence of solar radiation, based on absorbing full spectrum solar radiation;
harvesting a second heat from the phase change material in the presence of solar radiation;
storing molecular energy in a molecular storage material in the presence of solar radiation, based on absorbing full spectrum solar radiation;
transferring the second heat from the phase change material to the molecular storage material in the absence of solar radiation; and
harvesting the molecular energy released by the molecular storage material.

11. The method of claim 10, wherein the second heat is transferred out of the phase change material through a heat transfer fluid.

12. The method of claim 10, wherein the molecular storage material is configured to isomerize a parent molecule into a child molecule upon exposure to full spectrum solar radiation.

13. The method of claim 12, wherein the child molecule includes a higher energy state than the parent molecule.

14. The method of claim 13, wherein the second heat is transferred from the phase change material to the molecular storage material through a heat transfer fluid.

15. The method of claim 14, further comprising isomerizing the child molecule into the parent molecule thereby releasing molecular energy, by heat from the heat transfer fluid.

16. The method of claim 10, wherein the phase change material includes a solid phase change material.

17. The method of claim 16, further comprising transforming the solid phase change material into a liquid phase change material.

18. The method of claim 17, further comprising storing, in the liquid phase change material, latent heat absorbed from full spectrum solar radiation.

19. An apparatus for solar thermal harvesting and collection, the apparatus comprises:
an enclosure, wherein the enclosure includes:
a bottom layer including a phase change material, configured for storing heat in a phase change material in the presence of solar radiation, based on absorbing full spectrum solar radiation;
a middle layer including silica aerogel, disposed on the bottom layer;
a top layer including a molecular storage material disposed on the middle layer;
an anti-reflective glass disposed on a top surface of the top layer, configured to permit the transmission of full spectrum solar radiation;
a tube that is configured to connect the bottom layer and the top layer, and the tube is configured to allow a heat transfer fluid to flow therein;
a first valve disposed on the tube, when actuated, provides for thermal communication between the top layer and the bottom layer; and
a second valve, disposed on a portion of the tube connected to the bottom layer, the second valve, when actuated, provides for the harvesting of the stored heat.

* * * * *